(12) United States Patent
Kilar et al.

(10) Patent No.: US 10,070,183 B2
(45) Date of Patent: Sep. 4, 2018

(54) PROCESSING TECHNIQUES IN AUDIO-VISUAL STREAMING SYSTEMS

(71) Applicant: Verizon Digital Media Services Inc., Dulles, VA (US)

(72) Inventors: Jason A. Kilar, Hillsborough, CA (US); Richard W. Tom, San Francisco, CA (US); Lonn Lee, Belmont, CA (US); Bao Lei, San Bruno, CA (US); Jiwen Cai, Millbrae, CA (US); Yanqing Zhou, San Francisco, CA (US); Jocelyn Lui, San Francisco, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 23 days.

(21) Appl. No.: 14/970,523

(22) Filed: Dec. 15, 2015

(65) Prior Publication Data

US 2016/0173944 A1 Jun. 16, 2016

Related U.S. Application Data

(60) Provisional application No. 62/092,197, filed on Dec. 15, 2014, provisional application No. 62/195,110, filed on Jul. 21, 2015.

(51) Int. Cl.
*H04N 5/445* (2011.01)
*H04N 21/45* (2011.01)
(Continued)

(52) U.S. Cl.
CPC ......... *H04N 21/4516* (2013.01); *G06F 3/005* (2013.01); *G06F 3/017* (2013.01);
(Continued)

(58) Field of Classification Search
CPC .................. H04N 21/4516; H04N 21/422
(Continued)

(56) References Cited

U.S. PATENT DOCUMENTS 5,270,690 A * 12/1993 Oberg ................. G06F 3/0362
345/163
5,714,698 A * 2/1998 Tokioka ................ G06F 3/014
73/510
(Continued)

FOREIGN PATENT DOCUMENTS

WO 2016100408 6/2016

OTHER PUBLICATIONS

PCT/US2015/065916, "International Search Report and Written Opinion Received", dated Apr. 22, 2016, 13 pages.
(Continued)

*Primary Examiner* — Pankaj Kumar
*Assistant Examiner* — Sahar Aqil Riaz
(74) *Attorney, Agent, or Firm* — Los Angeles Patent Group; Arman Katiraei

(57) ABSTRACT

Techniques are disclosed that generally relate to content delivery techniques in audio-visual systems. In an audio-visual system, a method of using sensors to incrementally present content elements on a display includes presenting a first content element on the display, receiving first data from a sensor, the first data associated with a first distance. An increment coefficient is identified, and a portion size is determined by reducing the first distance by the increment coefficient. Finally, an unseen portion of a second content element is incrementally added to the display, and a presented portion of the first content element is incrementally removed from the display, the size of the portions added and removed being equal to the determined portion size.

18 Claims, 18 Drawing Sheets

(51) Int. Cl.

| | |
|---|---|
| *H04L 29/06* | (2006.01) |
| *H04B 1/3827* | (2015.01) |
| *H04N 21/442* | (2011.01) |
| *H04N 21/414* | (2011.01) |
| *H04N 21/422* | (2011.01) |
| *H04N 21/458* | (2011.01) |
| *H04N 21/61* | (2011.01) |
| *G06F 3/01* | (2006.01) |
| *G06F 3/00* | (2006.01) |
| *G06F 3/0488* | (2013.01) |
| *H04N 21/2343* | (2011.01) |
| *G06F 3/0485* | (2013.01) |
| *H04N 21/462* | (2011.01) |
| *H04N 21/472* | (2011.01) |
| *H04N 21/658* | (2011.01) |
| *H04N 21/81* | (2011.01) |
| *H04N 21/845* | (2011.01) |
| *G06Q 30/00* | (2012.01) |
| *G06F 3/0482* | (2013.01) |
| *H04H 60/33* | (2008.01) |
| *H04H 60/32* | (2008.01) |

(52) U.S. Cl.
CPC ......... *G06F 3/0482* (2013.01); *G06F 3/0485* (2013.01); *G06F 3/0488* (2013.01); *G06F 3/04883* (2013.01); *G06F 3/04886* (2013.01); *G06Q 30/00* (2013.01); *H04B 1/3827* (2013.01); *H04L 67/42* (2013.01); *H04N 21/23439* (2013.01); *H04N 21/234327* (2013.01); *H04N 21/234345* (2013.01); *H04N 21/41407* (2013.01); *H04N 21/422* (2013.01); *H04N 21/42224* (2013.01); *H04N 21/44218* (2013.01); *H04N 21/458* (2013.01); *H04N 21/4622* (2013.01); *H04N 21/472* (2013.01); *H04N 21/6125* (2013.01); *H04N 21/6582* (2013.01); *H04N 21/812* (2013.01); *H04N 21/8456* (2013.01); *G06F 2203/04803* (2013.01); *H04H 60/32* (2013.01); *H04H 60/33* (2013.01)

(58) Field of Classification Search
USPC .................................................. 725/40, 44
See application file for complete search history.

(56) References Cited

U.S. PATENT DOCUMENTS

| | | | |
|---|---|---|---|
| 6,002,808 A | 12/1999 | Freeman | |
| 9,367,227 B1* | 6/2016 | Kim | .................... G06F 3/04883 |
| 9,747,027 B2* | 8/2017 | Ward | .................. G06F 3/04886 |
| 9,842,571 B2* | 12/2017 | Hong | ........................ G09G 5/34 |
| 2008/0022223 A1* | 1/2008 | Seet | ........................ G06F 3/0483 |
| | | | 715/776 |
| 2012/0001875 A1 | 1/2012 | Li et al. | |
| 2012/0280918 A1* | 11/2012 | Stewart | ............... G06F 3/04883 |
| | | | 345/173 |
| 2012/0312956 A1* | 12/2012 | Chang | ..................... G06F 3/017 |
| | | | 250/201.1 |
| 2013/0162520 A1* | 6/2013 | Kettle | ..................... G06F 3/017 |
| | | | 345/156 |
| 2013/0321268 A1* | 12/2013 | Tuck | ........................ G06F 3/041 |
| | | | 345/157 |
| 2014/0027606 A1 | 1/2014 | Raynor et al. | |
| 2014/0215413 A1* | 7/2014 | Calkins | ............... G06F 3/04883 |
| | | | 715/863 |
| 2014/0285507 A1* | 9/2014 | Sato | .................... G06F 3/04883 |
| | | | 345/582 |
| 2015/0186397 A1* | 7/2015 | Cueto | ............... G06F 17/30126 |
| | | | 715/854 |
| 2015/0382066 A1* | 12/2015 | Heeter | ............ H04N 21/47217 |
| | | | 386/234 |
| 2016/0187976 A1* | 6/2016 | Levesque | ................ G06F 3/016 |
| | | | 705/14.4 |
| 2016/0364002 A1* | 12/2016 | Gates | ..................... G06F 3/017 |

OTHER PUBLICATIONS

PCT/US2015/065916, "Invitation to Pay Add'l Fees and Partial Search Report", dated Feb. 11, 2016, 2 pages.

\* cited by examiner

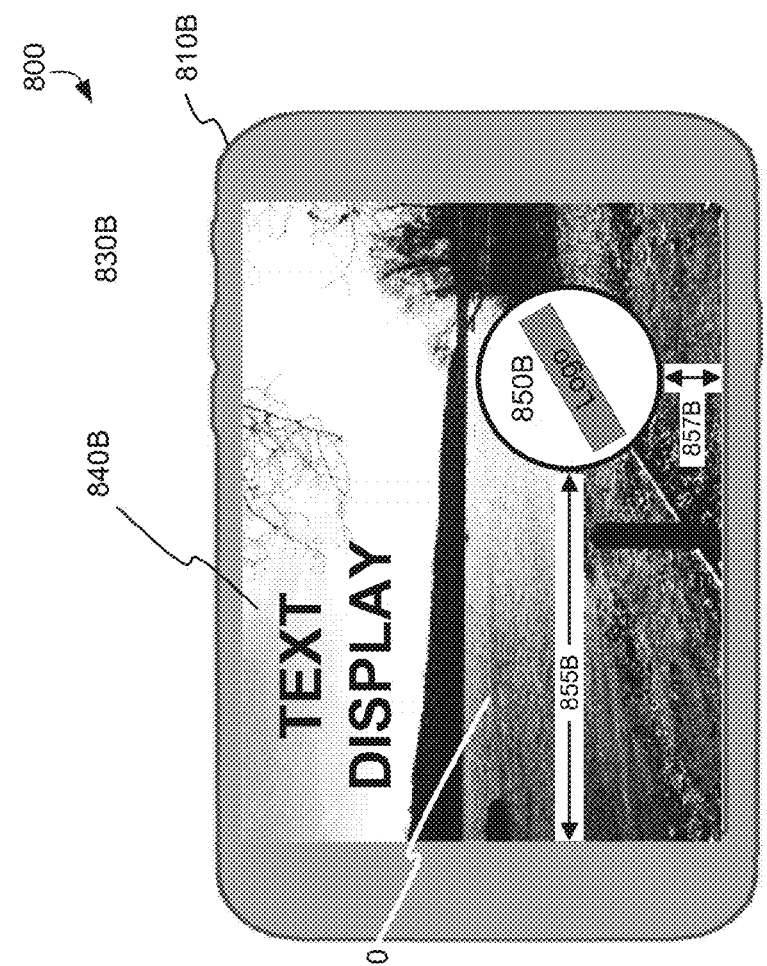
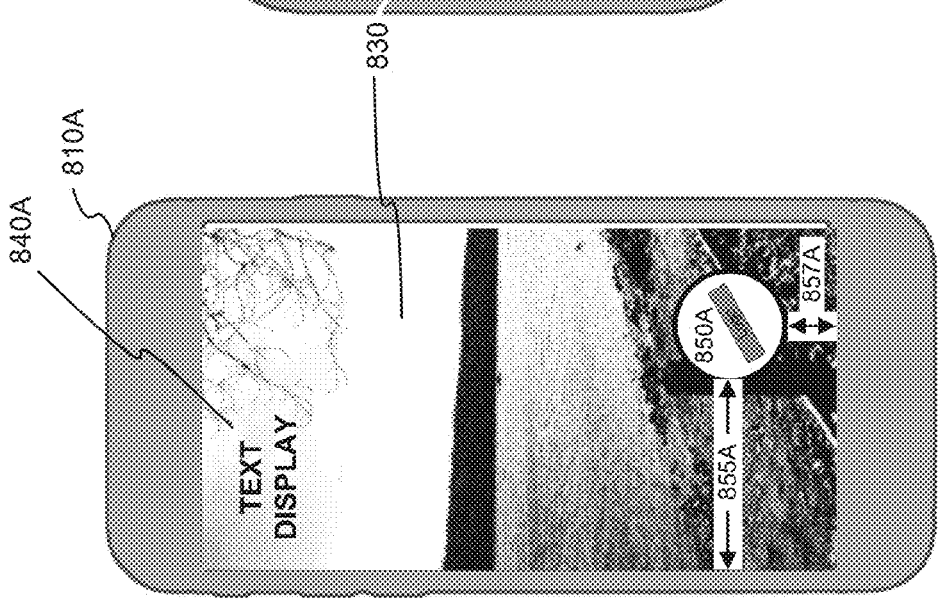

PROCESSING TECHNIQUES IN AUDIO-VISUAL STREAMING SYSTEMS

CROSS-REFERENCES TO RELATED APPLICATIONS

This application claims priority to U.S. Provisional Patent Application Nos. 62/092,197, filed on Dec. 15, 2014, and 62/195,110, filed on Jul. 21, 2015, the disclosures of which are hereby incorporated by reference in their entirety for all purposes.

FIELD

Embodiments of the invention relate to the field of computing systems; and more specifically, to processing techniques in audio-visual (AV) streaming systems.

BACKGROUND

Distribution of audio-visual data from one or more content servers to remote client devices may be implemented over public and/or private telecommunication networks, such as the Internet. In some systems, audio-visual content may be distributed using streaming technologies. The term audio-visual content/media may be used herein to refer to audio only content, image only content, video only content, or combinations thereof.

In some systems, audio-visual content may be distributed to a broad variety of different mobile devices. Each of the different mobile devices may have different display characteristics, e.g., screen size, availability of portrait and/or landscape viewing. Given these factors, it can be difficult for a server to provide viewable content items to different users.

BRIEF SUMMARY

The present disclosure relates generally to processing techniques in audio-visual streaming systems. In some embodiments, an audio-visual streaming system may include an application server and a storage server, which can rely upon a content distribution network (CDN), to provide user interfaces for selecting audio-visual content and viewing audio-visual content. In some embodiments, the audio-visual streaming system may also perform various processing techniques for providing new forms of user-customized content.

In some embodiments, a method of using sensors to incrementally present content elements on a display includes presenting a first content element on the display, receiving first data from a sensor, the first data associated with a first distance. An increment coefficient is identified, and a portion size is determined by reducing the first distance by the increment coefficient. Finally, an unseen portion of a second content element is incrementally added to the display, and a presented portion of the first content element is incrementally removed from the display, the size of the portions added and removed being equal to the determined portion size.

In additional embodiments, a method is provided that is performed at a mobile device, and starts with sending, from a device to a server, a request for an image, the image to include a background image and at least one layer image. Next, background data corresponding to the background image and first layer data referencing a plurality of versions of a first layer image to be displayed on the background image are received. A display characteristic of the mobile device is identified, and a first version of the first layer image of the plurality of versions of the first layer image is obtained based on the characteristic using the first layer data. The background image is obtained using the background data and a position on the background image to overlay the first version of the first layer image is identified according to one or more rules. Finally, a final image that includes the first version of the first layer image overlaying the background image at the identified position is generated by the mobile device.

In some embodiments, a method is provided that starts with receiving a first image, the first image having first dimensions. A display frame is identified for the first image, the display frame having second dimensions, the first and second dimensions being different. Next, a display position of the first image in the display frame is identified such that the display frame has a first blank space where the first image does not fill the display frame. The first image is transformed to obtain a fill image, the transforming including generating a reflection image based on the first image, the reflection image being a reflective version of at least a portion of the first image. Finally, the reflection image is sized to the blank space to obtain the fill image, and the fill image is displayed, along with the first image in the blank space within the display frame.

The foregoing, together with other features and embodiments will become more apparent upon referring to the following specification, claims, and accompanying drawings.

BRIEF DESCRIPTION OF THE DRAWINGS

FIGS. 8A-8B illustrates another view of mobile devices of different sizes and display orientations, according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Audio-Visual Streaming Service

A. System

Figure 1:
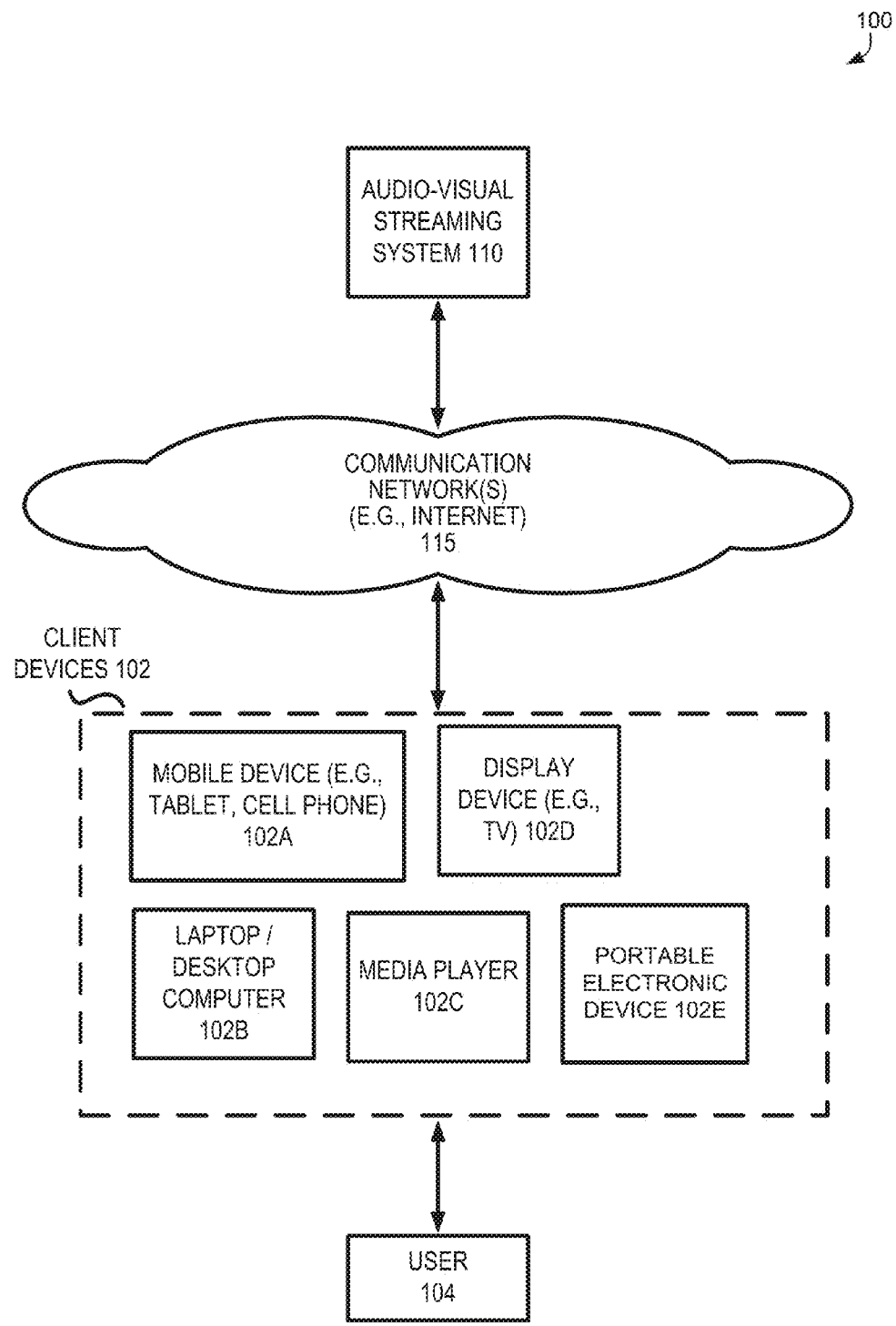
FIG. 1 illustrates a high-level block diagram of components involved in an audio-visual streaming system according to some embodiments of the present invention.

FIG. 1 illustrates a high-level block diagram of components involved in an audio-visual streaming system according to some embodiments of the present invention. FIG. 1 depicts a user 104 that may use different types of client devices 102, which may be communicatively coupled with the audio-visual streaming system 110 via one or more communication networks 115.

In various embodiments, the entities depicted in FIG. 1 (and other entities, such as devices of a CDN not depicted here) may be implemented by computing devices of various types including, but not limited to, personal computers (PCs), desktop computers, mobile or handheld devices such as laptops, mobile phones, tablets, etc., set-top boxes, smart televisions, and other types of devices. For example, the client devices 102 for displaying audio-visual content may include one or more of a laptop or desktop computer 102B, a mobile device 102A such as a tablet or cell phone, a media player 102C such as a set-top box or a DVD and/or Blu-Ray Player, a display device 102D such as a smart television, etc.

Some or all of the entities depicted herein may utilize one or more communication networks 115 to facilitate communications. The one or more communication networks 115 can include networks of various types, each possibly including one or more networking devices or equipment including but not limited to network switches, routers, bridges, load balancers, etc. Examples of one or more communication networks 115 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), UDP, RTSP, Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

As one example, a client device 102 (e.g., computer 102B) may utilize a web browser application to access the audio-visual streaming system 110. The web browser application may utilize an application designed for (or operable using) devices having a particular operating system. Such configurations may utilize Progressive/HLS or just HLS as a video delivery protocol, HTTP for communications, require authentication tokens for access, utilize expiring tokens for content-specific URLs, utilize single-use content URLs, concurrent stream detection, geographic blocking, device invalidation support, secure application storage, and/or audio-visual output protection.

Having discussed some of the components of an exemplary audio-visual streaming system, we now turn to an different examples of client devices 102.

B. Example Client Device

Figure 2:
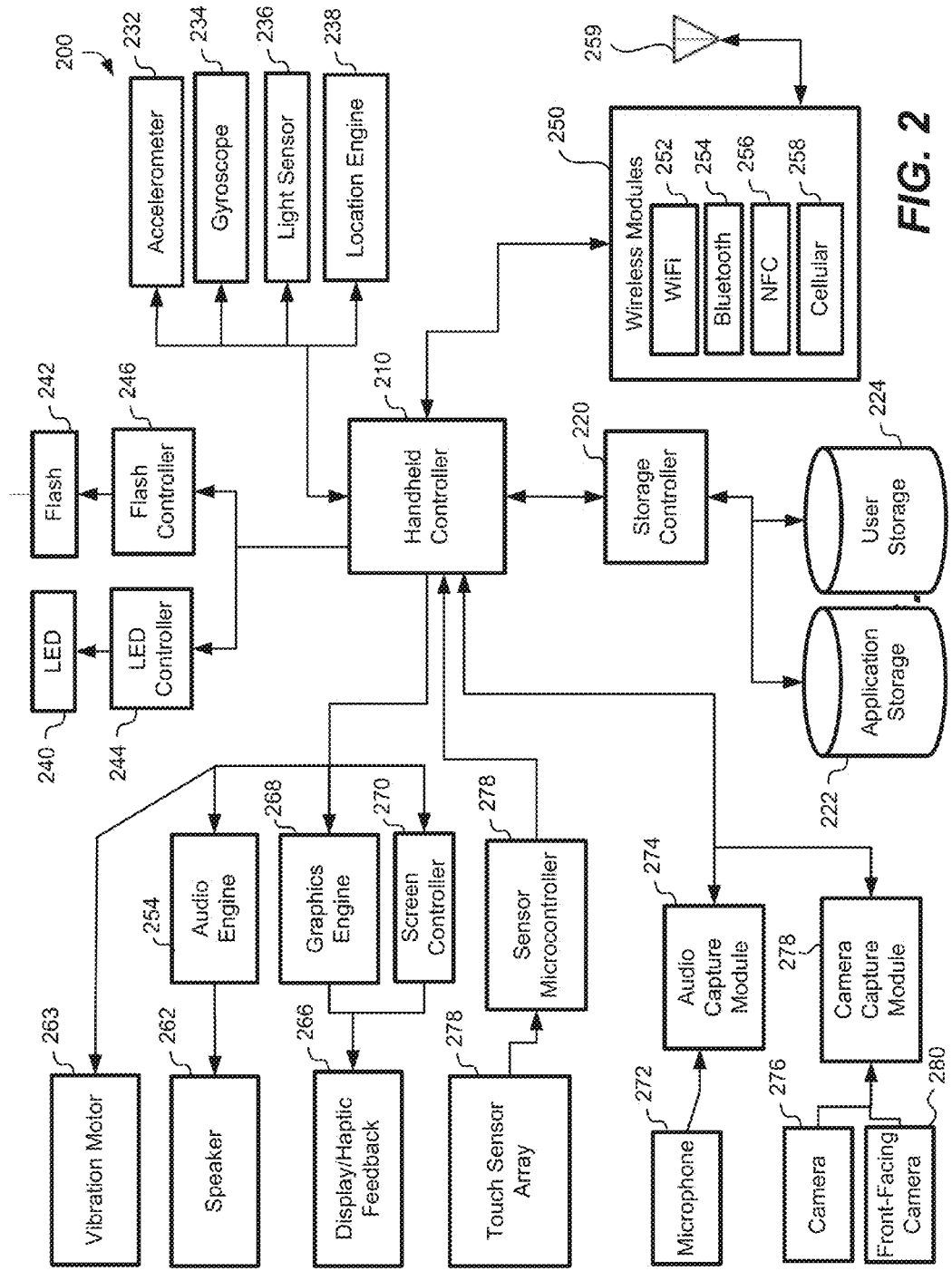
FIG. 2 illustrates example components of portable electronic device used by some embodiments.

FIG. 2 illustrates example components of portable electronic device 210, this device being similar to mobile device 102A of FIG. 1 above. Portable electronic device 210 can connect to communication networks 115 using one or more antennas 259, and wireless modules 250 (e.g., Wi-Fi 252, Bluetooth 254, NFC 256 and/or cellular 258). Once connected to audiovisual streaming system 110, portable electronic device 210 can use input and output hardware components and/or sensors to enable different embodiments described herein.

Input sensors that can be used by portable electronic device 210 described herein include, accelerometer 232, gyroscope 234, and light sensor 236. Location engine 238 can use geolocation hardware components (e.g., wireless signal receivers, iBeacon, NFC, Global Positioning System (GPS), and/or other similar components). Sensors can be used to locate nearby portable electronic devices 210 (e.g., Bluetooth 254, NFC 256, and or other similar sensing hardware). Other input components used by some embodiments include microphone 272, camera 276, and front-facing camera 280, respectively controlled and/or providing capture by audio capture module 274 and camera capture module 278. One having skill in the relevant art(s), given the description herein, will appreciate that other input and or sensor components can be used by embodiments of portable electronic device 210.

Output components used by some embodiments include speaker 262, display 266, LED 240, and flash 242, respectively controlled and/or relayed output information by, audio engine 264, graphics engine 268 and screen controller 270, LED controller 264, and flash controller 246. Other output components used by mobile devices 224 include NFC 256 and Bluetooth 254, which, beyond wireless communication capabilities, can also be used to send instructions to certain devices.

One having skill in the relevant art(s), given the description herein, will appreciate that other combinations of similar components can be used to provide the features of the components described above, e.g., components described above could be replaced by components that have been combined into integrated components and/or components that have been divided into multiple components, e.g., a variation of camera 276 can include a camera capture module 278 as an integrated unit. Additional descriptions of example components used by mobile device 224 are provided below.

II. Content Weighting Using Increased Scrolling and/or Tension

In user interfaces, it sometimes can be challenging to draw user attention to important user interface elements, while maintaining the overall look/feel of a coherent user interface. In some embodiments, the system may create user interfaces that are able to draw increased user-focus upon important user interface elements.

In some embodiments, an increased scrolling time/window is configured for a display element to enable a longer user engagement with the display element. For example, in some embodiments the user may tie scroll events to a visual queue element. Accordingly, each scroll event may animate the visual queue element (to indicate that the user interface is responsive to the user input, for example), but the display element does not move during a certain number of these scroll events.

As one example, a user may scroll through a long view/page normally, with each "scroll" causing the view to move by a certain number of lines/pixels. When the user interface reaches the targeted display element (configured for enhanced focus), each user scroll may be intercepted, and instead of moving the view (by the certain number of lines/pixels), the targeted display element may not move, but instead the visual queue element will be updated to show system responsiveness. After a certain number of scroll events by the user, in some embodiments, the user interface will return to normal and continue with "regular" scrolling and modify the view by the certain number of lines/pixels for each scroll event. In some embodiments, a similar effect may be implemented by increasing a tension amount required for the user to "pull" through a targeted display element. In various embodiments, the targeted display element may be a photograph, portion of text, advertisement, video, combination thereof, etc.

The present disclosure relates generally to content delivery techniques in audio-visual streaming systems. In some embodiments, the system may create user interfaces that are able to draw increased user-focus upon important display elements (also termed herein "content elements"). Also, where it is advantageous to make particular display elements visible to a user for a minimum period of time, some embodiments are able to cause a delay that is actuated by data received from sensors. Additionally, in some embodiments the scrolling (also termed herein "incrementing") of important display elements (also termed herein "outputs") is indicated by a visual queue element. In some embodiments, this visual queue element can be useful to give feedback to the user, providing information about the incrementing of a display element, even when the display element is not visibly moving.

Some embodiments described herein enable a user to scroll through a long view/page normally, with each "scroll" causing the view to move by a certain number of lines/pixels. When the user interface reaches the targeted display element (configured for enhanced focus and/or selected for a delay in ending the display of the display element), each user scroll may be intercepted, and instead of moving the view (by the certain number of lines/pixels), the targeted display element may not move, but instead the visual queue element (also termed herein a "visual indicator") will be updated to show system responsiveness. After a certain number of scroll events by the user (determined by an "increment coefficient," described below), in some embodiments, the user interface will return to normal and continue with "regular" scrolling and modify the view by the certain number of lines/pixels for each scroll event. In some embodiments, a similar effect may be implemented by increasing a tension amount required for the user to "pull" through a targeted display element. In various embodiments, the targeted display element may be a photograph, portion of text, advertisement, video, combination thereof, etc.

Accordingly, in an example, for each scroll event an important display element either does not move for a certain number of scroll events, or moves at a slower rate than the scroll event distance would normally cause (e.g., instead of moving the same distance as a mouse or finger drag, the important content moves less or not at all for each event).

A. Tunable Delay with Sensors

Figure 3:
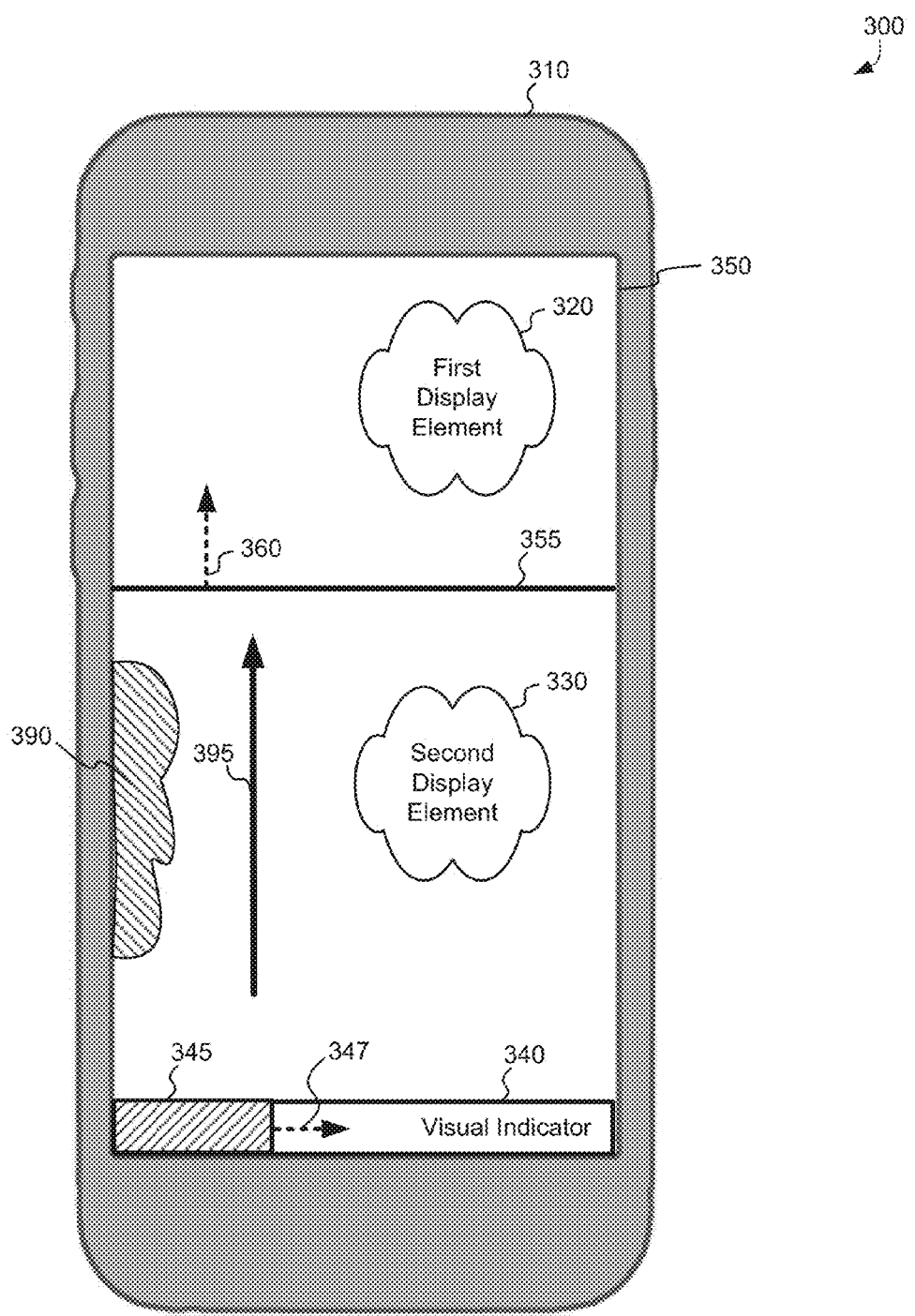
FIG. 3 illustrates the use of sensors integrated into a portable electronic device to display output with tunable delays, according to some embodiments.

FIG. 3 illustrates the use of sensors integrated into a portable electronic device to display output with tunable delays, according to some embodiments. FIG. 3 depicts a portable electronic device 310 (also termed herein, a "device") having a display 350 over sensors 390. Display 350 presents first display element 320 and second display element 330 (also collectively referred to herein as "the display elements") separated by boundary 355, such boundary moving in some embodiments according to arrow 360. At the bottom of display 350, visual indicator 340 has an indicator region 345 that can expand according to arrow 347. Sensors 390 can receive inputs and generate sensor data 395. As described herein, inputs to sensors 390 (also termed herein "gestures," "scrolling" "scroll events," and/or other similar terms) are collectively referred to as sensor data (e.g., sensor data 395). Also, because in some embodiments sensors 390 may be installed underneath the display of a portable electronic device (e.g., display 350), for convenience, sensors 390 only appear on FIG. 3. It should be appreciated that embodiments use different types of sensors to receive input for the performance of different stages.

Some embodiments present one or more display elements on a display 350 of a portable electronic device 310. As used herein, display elements (e.g., first display element 320, second display element 330) presented (also termed "shown," "displayed") are visual, being still images (e.g., pictures, line art, cartoons, solid colors) and/or moving images (e.g., video, animation), displayed on a portable electronic device display (e.g., display 350). As noted above, the embodiments using portable electronic devices (e.g., portable electronic device 310) discussed herein can also be applied to non-portable electronic devices, such as desktop computers, televisions, and/or other electronic devices with displays.

In some embodiments, the display elements presented are from different sources (e.g., live or recorded video), are different types of visual content (e.g., images and/or video), and/or may have different purposes (e.g., to inform a user, to teach a user some fact, and/or to advertise products to a user). In some embodiments, the different display elements can be complementary, for example, a first output can be a news program, and a second output can be advertising.

In some embodiments, one or both presented display elements are presented with a delay, e.g., a period of time must pass before that content can be replaced on the display with other content. For example, returning to the news/ advertising embodiment discussed above, in some circumstances it is preferable that advertising content be displayed for a minimum period of time. Traditionally, this would occur by having a pause in the first output (e.g., the news) for a display of the second output for a set period of time (e.g., 15 or 30 seconds for television commercials). In some embodiments discussed herein, the first and second display elements are displayed on a portable electronic device display, with a delay placed upon the output of the first and/or second output using different approaches described herein, and approaches that would be apparent by one having skill in the relevant art(s), given the description herein.

In some embodiments, as depicted on FIG. 3, first display element 320 and second display element 330 are presented, and able to be scrolled up and down, e.g., as first display element 320 moves up, second display element 330 also moves up, and boundary 355 between the display elements moves up as well.

To move the display elements, some embodiments receive sensor data, parse the sensor data, determine the significance of the sensor data based on a variety of factors discussed herein, and manipulate the display elements (e.g., scroll up, down, or move in different directions), based on the sensor data. Phrased differently, upon the receipt of sensor data 395, an unseen element of second display element 330 can be displayed at the bottom of display 350, and an element of first display element 320 can be removed from the opposite end of display 350.

In other embodiments, e.g., discussed in detail with the description of FIGS. 3 and 4 below, during incremental movement by embodiments, first display element 320 moves incrementally upward while second display element 330 remains in place. With this variation, upon the receipt of sensor data 395, an unseen element of second display element 330 can be displayed below the boundary 355, and an element of first display element 320 can be removed from the opposite end of display 350.

In an example of the implementation of some embodiments, when first display element 320 is only displayed (e.g., no second display element 330) and sensors 390 receive sensor data moving up, in a straight line (e.g., sensor data 395), then first display element 320 moves at a rate that is very similar (or identical) to sensor data 395. As first display element 320 moves up and off the top of display 350, second display element 330 can appear at the bottom of display 350, making it appear that display elements can continuously and/or incrementally scrolling across portable electronic device 310 vertically.

Some embodiments enable a user to scroll one or more display elements using sensor data (e.g., from sensor data 395) collected by sensors in display 350 (e.g., sensors 390). In some embodiments, sensors 390 are touch-screen sensors utilized behind display 350 so as to provide sensor input related to content displayed on display 350. In some embodiments, sensors 390 receive data related to content displayed on display 350 in other ways, e.g., using a video camera to input and parse gestures from video systems (e.g. a motion sensing input device). In some embodiments, the sensor data can be from a computer mouse (e.g., clicking and dragging, and/or using a scroll wheel). The concepts described herein can be applied to many different similar circumstances.

As discussed herein, scroll events that increment display elements are, for convenience, discussed as moving upwards, e.g., as with sensor data 395. It should be appreciated that different directions for incrementing and gesture directions can be used according to the teachings herein.

Though not shown on FIG. 3, a "deincrementing" gesture can also be used by some embodiments. This gesture reverses the incrementing of display elements, and, if shown on FIG. 3, would be a downward gesture. As described further below, some embodiments treat this deincrementing gesture differently, e.g., for delays caused, movement of display elements, etc.

As display elements are incremented on display 350, visual indicator 340 can show the increment progress of one or more display elements. For example, as a user views second display element 330, indicator region can become larger or smaller based on how much of the display element has been viewed. This progress for the viewing of particular elements can be useful to provide user feedback for embodiments discussed below, that have delays in the incrementing of display elements. Examples of the use of visual indicators with other embodiments are provided with the discussion of FIGS. 3 and 4 below.

B. Incrementing Coefficients

As introduced above, some embodiments described herein have a user scroll (e.g., causing sensor data 395) through a long view/page normally (e.g., while viewing first display element 320), with each "scroll" causing the view to move by a certain number of lines/pixels. When the user interface reaches the targeted display element (e.g., second display element 330) each user scroll may be intercepted, and instead of moving the view (by the certain number of lines/pixels), an increment coefficient, changes the movement of the view to reflect a different treatment of targeted display elements.

In an example, as a user scrolls (e.g., causes sensor data 395), the appearance of second display element 330 can cause a change in the way one or more display elements are scrolled, this change potentially causing a delay in the time it takes for (targeted) second display element 330 to be removed from visibility on display 350. This delay in removal can allow the second display element to remain on display 350 for a longer period of time than the non-delayed first display element 320.

As noted above, deincrementing gestures (e.g., gestures a user can use to go backwards) may be subject to different increment coefficients (or not be subject to increment coefficients) by some embodiments. In a situation, for example, where a user views a targeted display element and wants to go back a view portions of the element again, increment coefficients may not need to be reapplied to this action to accomplish system goals, because the element has already been displayed for a target period of time.

As discussed herein, using sensors to delay the removal of display elements can be accomplished in different ways. In some embodiments, a gesture (e.g., touch input causing sensor data 395 to be generated) on display 350 can be measured, and the determined length of the gesture, instead of moving the display elements at a 1:1 ratio, instead moves the display elements at a lesser ratio, based on different criteria discussed below. Thus, continuing the example discussed above, after second display element 330 appears at the bottom of display 350 (or after a portion, e.g., a percentage, such as 10%, 20%, or other percentage), some embodiments are configured to receive sensor data 395, and only move the display elements a third as much as before (or another fraction). In some embodiments, this increment percentage (or fraction) can be termed an increment coefficient, and can be set by an administrator (or other user), and/or determined by embodiments based on different factors discussed herein. The changeable nature of this increment coefficient make the delays that can be imposed tunable based on different considerations described herein.

For example, after the change in behavior associated with scroll-events is implemented by some embodiments, a user may have to make three swipes upward on display 350 to have the scrolling effect of one swipe before the change in behavior. Alternatively, each swipe upward (e.g., sensor data 395) of a particular length could have the effect of a swipe of only 1/3 of the length of a swipe before the change in behavior. In this example, these alternatives are different implementation examples of an increment coefficient of 1/3. One having skill in the relevant art(s), given the description herein, will appreciate that other increment coefficients could be selected and implemented to different beneficial effects. In this example, this increment coefficient is 1/3 for some types of display elements (e.g., fast food advertisements), 1/2 for some types of display elements (e.g., content that a user has been presented with before using a delay), and 1/1 for some types of display elements (e.g., non-advertisements). In some embodiments, these values are set by the operators of the system, based on expertise and empirical analysis, and in some embodiments the system can analyze the content to be presented, and select a coefficient based on rules and/or other similar approaches.

In some embodiments, a selected increment coefficient can be altered for a particular gesture by additional factors, e.g., the pressure of the gesture exerted by user 380 on display 350. For example, if an increment coefficient is determined that enables scrolling at a 1/2 rate, when user 380 exerts extra force during the gesture (e.g., pushing harder) the increment increases to 4/5 (e.g., causing the display element to scroll at a faster rate than before the harder push). In another example of this change to increment coefficient approach, the velocity of a gesture (e.g., a swipe, mouse wheel turn, etc.) can be measured and the increment coefficient changed based on the measurement. For example, for two swipes of the same distance but different swipe velocities, the faster swipe can have a larger increment coefficient, while the slower swipe has a smaller increment coefficient. Additional factors that can be measured and used by some embodiments to affect the increment coefficient include: the uniformity of swipe characteristics, the shape of repeated swipes (e.g., short, long, curved, crooked, and/or other similar characteristics). One having skill in the relevant art(s), given the description herein, will appreciate many different ways that this approach can be implemented by embodiments.

In another approach used by some embodiments to selecting increment coefficients for display elements, a target delay for a display element can be initially selected. For example, a target minimum 30 seconds of display time may be selected for second display element 330. Based on an estimate of typical user behavior with respect to required swipes to transition second display element 330 off of display 350, an increment coefficient can be automatically determined by some embodiments that is estimated to keep second display element 330 visible for the selected minimum time of 30 seconds. This estimate can consider the different elements of the particular transition, such as the length of content to be scrolled on or off display 350, the average swipe length, the average speed of swipes, and/or other similar data.

To improve the accuracy and/or customer satisfaction with use of the user interface, averages can be determined based on the level of enjoyment an average user has with a content item. For example, if users are determined to swipe differently (e.g., slower) based on their enjoyment of a content item, a minimum 30 second estimate could be determined based on the swiping characteristics for a user that enjoys the content. Using this approach would allow a user that does not enjoy the content presented to naturally swipe faster and reduce the delay before ending the presentation of the advertisement. One having skill in the relevant art(s), given the description herein, will appreciate that a varied approach could be taken where the faster swipes of users would be taken into account to persist the display element for the minimum target time period.

In some embodiments, this estimate can be further improved by gathering and analyzing data associated with the behavior of the user currently estimated to be using the system (e.g., based on login or other similar identifier), not just research based on average users and their interaction with the interface. It should also be appreciated that increment coefficients need not be static for a particular display element during the display of the element. The analysis described above, e.g., relating to user behavior, can be applied to change an increment coefficient during the incremental transition, based on different considerations.

C. Example

Figure 4:
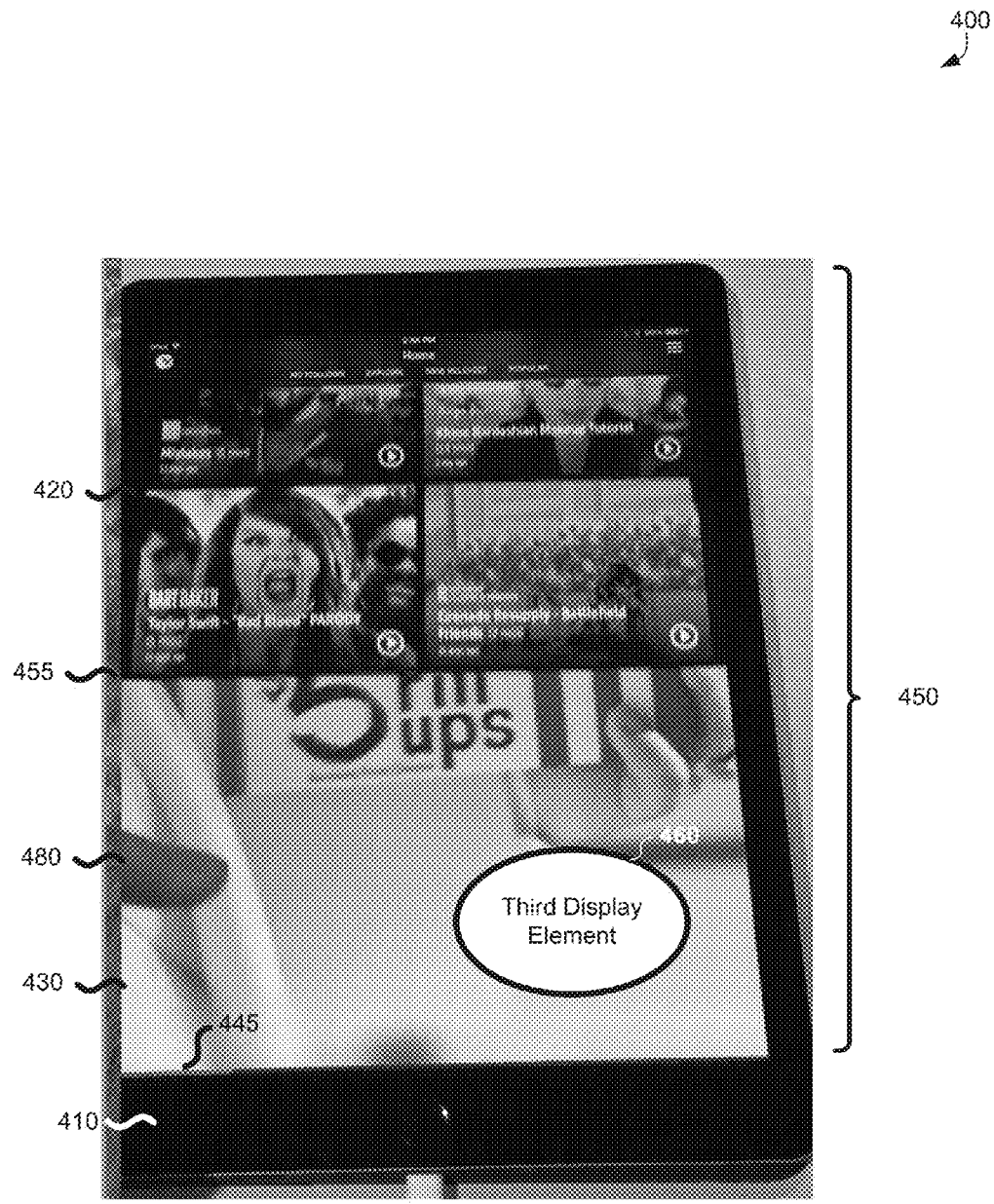
FIG. 4 is a screen capture of a portable electronic device using sensors to display output with tunable delays, according to embodiments.

FIG. 4 is a screen capture of a portable electronic device using sensors to display output with tunable delays, according to embodiments. FIG. 4 depicts a portable electronic device 410 with a display 450 presenting first display element 420 and second display element 430 separated by boundary 455, along with a third display element 460. At the bottom of display 450, a visual indicator has an indicator region 445. Sensors (not shown) with display 450 accept input from a user 480.

In the example shown in FIG. 4, portable electronic device 410 (a tablet) is similar to portable electronic device 210 from FIG. 2, with display 450 being bigger, but similar to display 350 in operation. In this embodiment, first display element 420 uses a grid-like user interface that allows navigation in multiple dimensions. In some embodiments of this grid-like user interface, a user 480 may scroll vertically, for example, to navigate through from first display element 420 to second display element 430, and user 480 may scroll horizontally to navigate through different content items of a particular category of content. This grid navigation approach is discussed further with the description of FIGS. 10 and 11 below.

As shown in FIG. 4, in some embodiments, a display element (e.g., second display element 430) can be a video that plays while other content (related or unrelated) is displayed and manipulated. It is worth noting that, in this example second display element 430 is an advertisement, while first display element 420 is a collection of video content typically sponsored by advertisements when shown.

During an example operation of portable electronic device 410 in FIG. 4, user 480, using a finger, can start by touching and vertically scrolling in first display element 420, moving one or more rows of video thumbnails into place for browsing and selection. It is important to note that the grid-like user interface shown in first display element 420 is only one of many ways to organize the display of content within display elements.

Continuing this example, once user 480 has browsed the rows of content available in first display element 420, additional content may be desired by the user. In this example, new grid items of content are received from the bottom of display 450. Thus, to reveal new content to browse, in this example user 480 scrolls upward on display 450, this upward scrolling bringing second display element 430 into view, with boundary 455 separating the two elements. In this example, it is advantageous that second display element 430 (e.g., an advertisement, as shown) be visible for a particular period of time (e.g., 30 seconds or some other interval).

As described above, in this example and in some embodiments, as second display element 430 appears on display 450, the appearance of the second display element triggers a change in behavior associated with the scrolling of display elements. In some embodiments, this triggered change in behavior makes user 480 make additional swipes upward on display 450 to have the scrolling effect of one swipe before the change in behavior, i.e., each swipe upward of a particular length could have the effect of a swipe of a fraction of the length of a swipe before the change in behavior.

Continuing the example shown in FIG. 4, as the swiping by user 480 continues (the effect of which is altered by the increment coefficient), second display element 430 incrementally comes into view, all the while playing a video advertisement, such video being incrementally revealed to the user. In this example, the video shown in second display element 430 plays the entire time the delayed scrolling (based on the increment coefficient) continues. In some implementations, this scrolling and playing can advantageously take longer than a traditional set period for the video to be displayed (e.g., new scrolling takes one (1) minute, while conventional time for video to be on screen could be 30 seconds). In this example, the increment coefficient is selected and/or determined first, and the display time for the second display element 430 results from a combination of the increment coefficient and the behavior of user 480, e.g., how fast user 480 chooses to swipe. As discussed with FIG. 2 above, in some embodiments, a target display time can be selected, and an increment coefficient can be determined that is estimated to result in the target time.

In some embodiments, display elements can be moved upwards as the scrolling is performed, e.g., first display element 420 moves upward in this example, with the second row moving upward, and the first row disappearing. While the first row of first display element 420 scrolls up and off the top edge of display 450, an unseen portion of second display element 430 can appear at the bottom edge of display 450.

In some embodiments, a display element can be revealed by the scrolling action (e.g., like a layer being removed from another, lower layer), as for example, in an example using FIG. 4, where second display element 430 is incrementally revealed by the removal of first display element 420 at boundary 455. When this layer-based approach is taken, a lower level display element (e.g., second display element 430), can be revealed, and similarly covered again by a higher-level display element (e.g., in FIG. 4, new grid content items could appear from the bottom of display 450, after user 480 has scrolled through the display of display element 430).

In some embodiments, a third display element (e.g., third display element 460) can appear (e.g., at a particular point on display 450, by scrolling onto the screen from an edge, and/or appearing based on the removal of display element 420 as a layer). Third display element 460 can, in some embodiments, be responsive to scrolling gestures by user 480 in a way different from the other two display elements. For example, while display element 430 is revealed by scrolling first display element 420 up at a particular distance per swipe, third display element 460 can scroll at a different pace, either slower or faster than first display element 420.

In some embodiments, the incremental presentation of display elements can be a combination of both these approaches, e.g., first being revealed like a top layer being removed form a lower layer (e.g., as shown in the example of FIG. 4), then with the entire display element (e.g., the video presented with second display element 430 shown in FIG. 4).

As noted above with FIG. 3, some embodiments provide a visual indicator (e.g., visual indicators 340 and 345) to indicate the incremental movement of display elements (e.g., 320, 330 and 420, 430), at least while the incremental coefficient is being used to delay the increment of display elements.

D. Visual Indicators of Incremental Display

Figure 5:
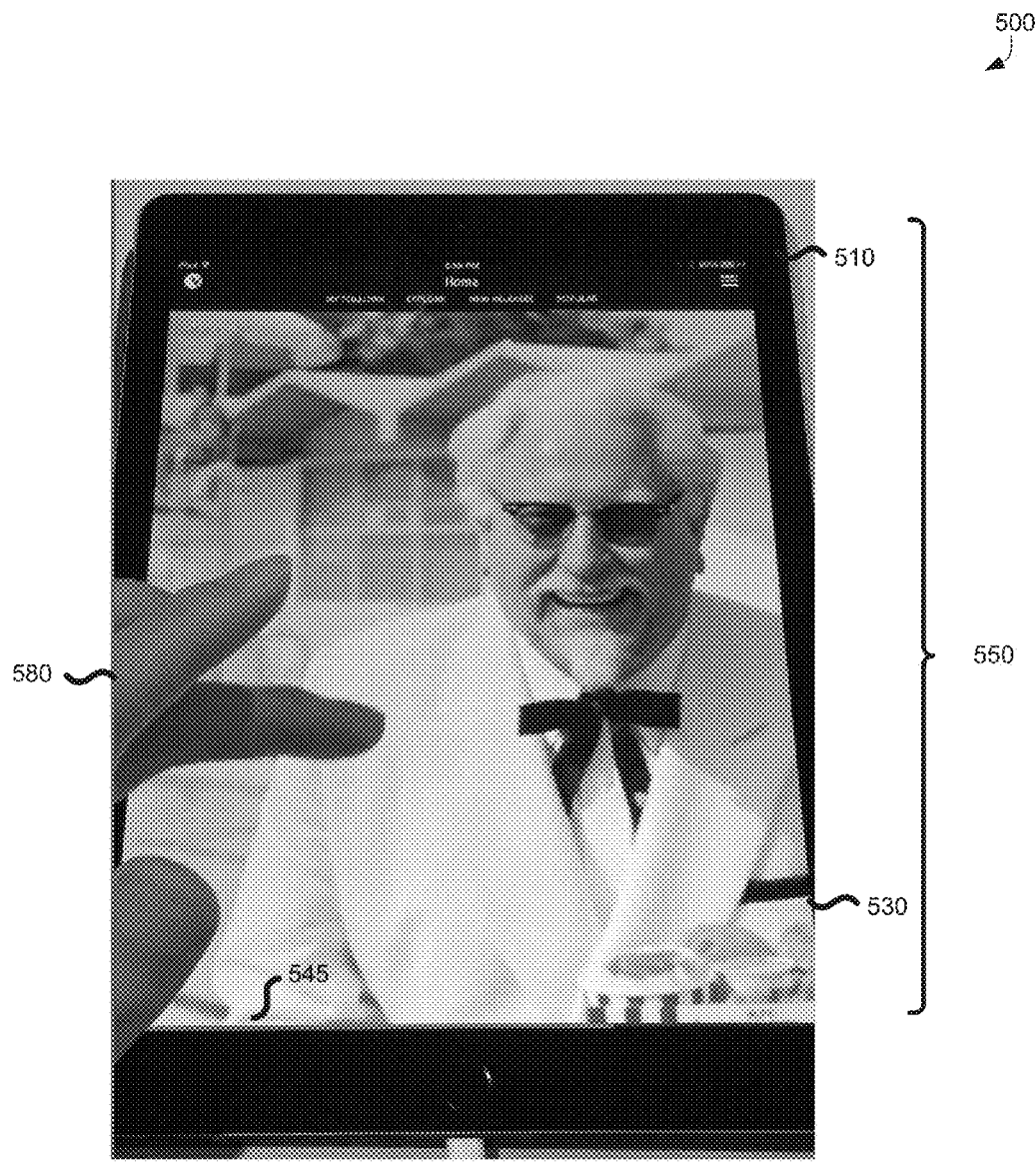
FIG. 5 is another screen capture of a portable electronic device using sensors to display output with tunable delays, according to embodiments.

FIG. 5 is another screen capture of a portable electronic device using sensors to display output with tunable delays, according to embodiments. FIG. 5 depicts a portable electronic device 510 with a display 550 presenting second display element 530. At the bottom of display 550, a visual indicator has an indicator region 545. Sensors with display 550 (not shown) are shown accepting input from a user 580.

In this example, because of the use of an increment coefficient to increment a countdown timer for the display of second display element 530, user 580 cannot see any display elements moving as a result of repeated scrolling actions. In this embodiment, a number is selected that represents a number of gestures (termed, for convenience "gesture count") needed to remove second display element 530 from display 550. As discussed above, a number of gestures per period of time can be estimated for a generic user, or a particular user, and this estimate can be used to select a gesture count that corresponds to a target period of time for displaying second display element 530. This gesture count can also be changed during the display of the display element, e.g., to speed up the display of another display element, extend the display based on an estimated interest in the display element by the user, and/or other similar factors.

Once a gesture count has been selected, an increment coefficient (incrementing the count, not scrolling, as discussed above), can also be selected, based on factors (e.g. different users, content, and/or other similar characteristics can be used to select this increment coefficient). In this example, an increment coefficient of two (2), can give user 580 the ability to gesture through the delay at double the rate of a user with a one (1) increment coefficient. The same approaches described above (e.g., hardness of touch, shape of gesture, velocity of gesture) can also be used to change the increment coefficient for each gesture, in some embodiments.

In this circumstance, visual indicator 545 (also termed a "visual cue") can be helpful to provide context to the user. In this situation, for example, after a first display element is completely removed from display 550, and second display element 530 is displaying a video for a period of time set by the gesture count discussed above (and not visibly moving upwards based on gestures), visual indicator 545 increments to the right to give the user feedback and an indication of progress in their efforts to show additional content items to select.

One having skill in the relevant art(s), given the description herein, will appreciate that any type of progress indicator (e.g., using display 550 elements, lights on device 510, sounds from speakers in device 510, and/or vibrations from a vibration motor in device 510), can be used to indicate incremental progress to user 580. One visual indicator that is used by some embodiments changes characteristics of the user interface, and/or the content being presented, e.g., the colors of separator bars can change based on progress and/or the color saturation of the displayed content can be altered to provide feedback to user 580.

E. User Engagement Data

Some embodiments described herein use sensor data to cause tunable delays in the display of content items. As described above, the sensor data collected by many embodiments involves an increased amount of user engagement as compared to traditional approaches used for user interaction with content. For example, having a user swipe a sensor multiple times during the playing of a video provides much more contact with a video consumer than a "skip this video" button does.

In some embodiments, the increased user engagement is correlated with the content presented and data is generated that estimates the consumer's assessment of the presented content. For example, for certain presentation characteristics (e.g., consumer, content, time of day, platform, and/or other characteristics), it may be determined that the hardness of the user's swipe gesture (e.g., as measured by the width of their finger impression and/or sensors that can assess the hardness of touch) is an indication of their like or dislike of particular content. Similarly, the velocity of swipes, the uniformity of swipe characteristics, the shape of repeated swipes (e.g., short, long, curved, crooked, and/or other similar characteristics) may, for some circumstances be indicative of the feeling of a consumer for the content, the presenter, the platform, and/or other parts of the user experience. One having skill in the relevant art(s), given the description herein, will appreciate many different ways that this approach can be implemented by embodiments.

In an example embodiment, a video is presented according to the increment coefficient approach described above, and a measurement of the interest by a user in the video during its presentation is required. As described in embodiments above, this video is not the "first choice" of the user, based on their gestures, and, as the user begins to see the video, the user may start by swiping quickly to reach their first choice. As the video plays however, the user may become more engaged in the video content and, either unconsciously because of their distraction, or consciously because they want the video to be presented longer, begin to slow down their swipes. In this way, interest in displayed content can be assessed by embodiments. One having skill in the relevant art(s), given the description herein, will appreciate how this approach can be applied to different types of content and/or different user input characteristics.

Figure 6:
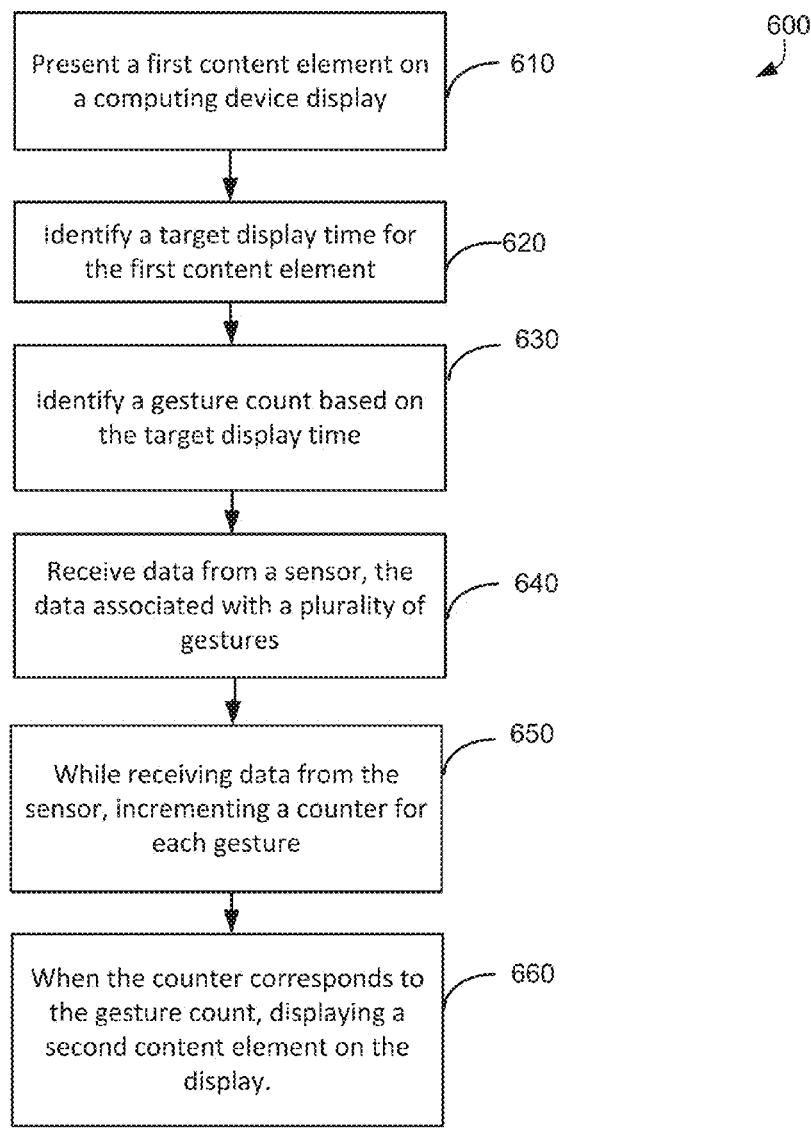
FIG. 6 shows a flowchart of a method of overlaying a layer image over a background image, according to an embodiment.

FIG. 6 is a flowchart describing a method of displaying a content element (also termed herein, a "display element") for a display time measured by user gestures. At stage 610, a first content element is presented on a computing device. In an embodiment, a first content element (e.g., first display element 320) is presented on a computing device (e.g., device 310). After stage 610 ends, stage 620 is performed.

At stage 620, a target display time is identified for the first content element. In an embodiment, a target display time (e.g., 5 second) is identified for the first content element (e.g., first display element 320). In some embodiments, a target display time can be based on metadata associated with display elements (e.g., first display element 320). After stage 620 ends, stage 630 is performed.

At stage 630, a gesture count based on the target display time is identified. In an embodiment, a gesture count based on the target display time is identified. Using a process discussed above, in some embodiments, a target display time (e.g., 5 seconds), can be converted into an estimated number of user gestures that would be performed during this interval. This estimate can be based on the person gesturing, the content of the element (e.g., more interesting content could motivate a user to gesture faster). To satisfy the expectations of some users, in some embodiments, users may be rewarded with a shorter display time based on the intensity of gesturing, e.g., harder work is often predicted to yield a reward. After stage 630 ends, stage 640 is performed.

At stage 640, data is received from a sensor, the data being associated with a plurality of gestures. In an embodiment, data is received from a sensor (e.g., a touch sensor included with display 350 of device 310), the data being associated with a plurality of gestures (e.g., user gestures on display 350). After stage 640 ends, stage 650 is performed.

At stage 650, while receiving data from the sensor, a counter is incremented for each gesture. In an embodiment, while receiving data from the sensor (e.g., the sensor in display 350), a counter is incremented for each gesture. After stage 650 ends, stage 660 is performed.

At stage 660, when the counter corresponds to the gesture count, a second content element is displayed on the display. In an embodiment, when the counter corresponds to the gesture count, a second content element (e.g., second display element 330) is displayed on the display (display 350).

III. Responsive Overlays

Figure 7:
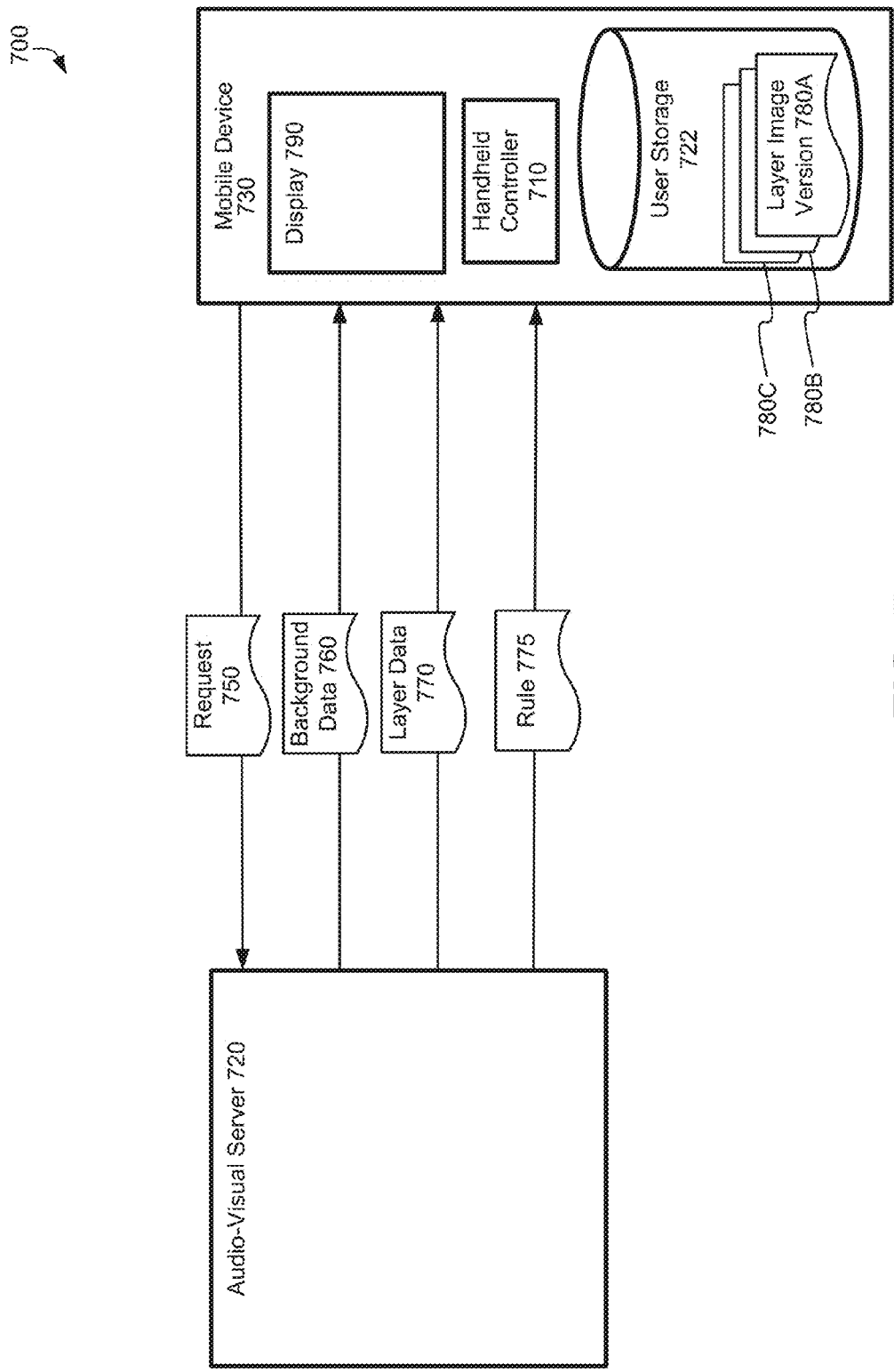
FIG. 7 shows a system for enabling responsive overlays of background images, according to an embodiment.

FIG. 7 is a system 700 to display responsive overlays over a background image on a mobile device. Mobile devices 730 can have different screen sizes, and/or different screen orientations (e.g., portrait, and landscape orientations shown with mobile devices 810A and 810B respectively shown below in FIGS. 8A and 8B). In conventional approaches to displaying images having overlaid objects, the layer and background images are rendered together when an image is originally created. In this approach, the content is already combined when received by an AV server, and does not exist as separate layers.

With a conventional video, to try to account for the display differences in devices (e.g., screen size, and/or current display orientation) some conventional approaches alter the content to create multiple versions, each version being modified to fit a target display.

Some embodiments described herein utilize cached objects and responsive overlays to provide content in a manner that is faster and/or more efficient than conventional approaches. In this approach, to display a completed graphic, the background and screen objects are sent to mobile device 730 separately. Additionally, multiple sizes of different objects can be sent to mobile device 730 and cached (e.g., in user storage 722), if needed, by different display configurations. In addition, rules (e.g., rule 775) can be sent, with the layers, that specify how the layers are to be combined in different circumstances. This approach can result in smaller amounts of graphical data being sent to mobile devices 730, and improve the performance of the graphics display. In some embodiments, by combining the layers at the mobile device, quality does not need to be sacrificed when combining the layers—both layers can be sent at high levels of quality, and that quality is maintained at the device.

Discussing FIG. 7 in further detail, in some embodiments, sending background data (e.g., background data 760) and information about objects to be displayed on the background data (e.g., layer data 770) can improve the performance of final images displayed on a mobile device (e.g., display 790 on mobile device 730). As shown in system 700 mobile device 730 sends a request 750 to audio-visual server 720, and AV server 720 responds with background data 760 and layer data 770 (or a link to one or both of these data items on an external source (not shown). As discussed further below, to position layer data 770 over background data 760, rule 775 is shown being received at mobile device 730 from AV server 720. Mobile device 730 can perform logical operations using handheld controller 710, and different data items can be stored for use in user storage 722, e.g., layer image versions 780A-780C.

FIGS. 8A-8B illustrate mobile devices 810A and 810B, showing graphics 830A and 830B, each graphic having a text element 840, and a logo 850. In some embodiments, graphic 830 can be animated or motion-based content such as an animation or video, or a still image. As used herein, the term "image" can mean a series of images, e.g., a video or other type of motion picture.

An example type of content that can be displayed in graphics 830 space is a graphic that has a background image (video or still image) with one or more layer images (also termed graphical objects e.g., text elements 840 and logos 850) displayed on top of the background image, e.g., in one or more overlays (also termed herein, layers). One example of this type is an advertisement. To promote visual impact of an advertisement, some advertisements can be created with desired placement of the overlays over the background. For example, the placement of the elements of FIGS. 8A and 8B can be the following: logo 850 should be right justified at the bottom of the screen, and equidistant from the edges, the respective distances from the edges being approximately 10% of the horizontal and vertical sizes of the screen.

In the examples shown with FIGS. 8A and 8B, a background video can be sent (or streamed) by AV streaming system 110 to mobile devices 810A and 810B. In addition, multiple sizes of logo 850 can be sent and cached on the mobile devices, e.g., logo 850A and 850B are shown having different sizes. In some embodiments, mobile device 810A and/or 810B receive and cache multiple sizes of the logos (e.g., 850A and 850B). Similarly, text elements 840A and 840B can be sent as images with different sizes, e.g., 840A and 840B have different sizes. Another way text elements 840 can be sent uses standard text to be combined with a font on mobile devices 810A and 810B.

Along with the layers received at mobile devices 810A and 810B, some embodiments also receive rules for placement of the screen objects in different circumstances. An example rule can specify distances 855 and 857 from the edge of a display screen, such distances being relative (e.g., 10%), absolute (40 pixels), or a combination of different approaches. Special exceptions can also be included in the rules, e.g., for mobile device 810B, as shown in FIG. 8B, an example rule can specify additional distance to be included when placing logo 850B near the right margin. Text elements 840A and 840B can be similarly sent to respective mobile devices 810A and 810B, and be placed using placement rules. One having skill in the relevant art(s), given the description herein, will appreciate that the rules can be flexibly specified, including specifying that objects be placed in relation to a center of the mobile device screen, in addition to the edge approach discussed above.

Figure 9:
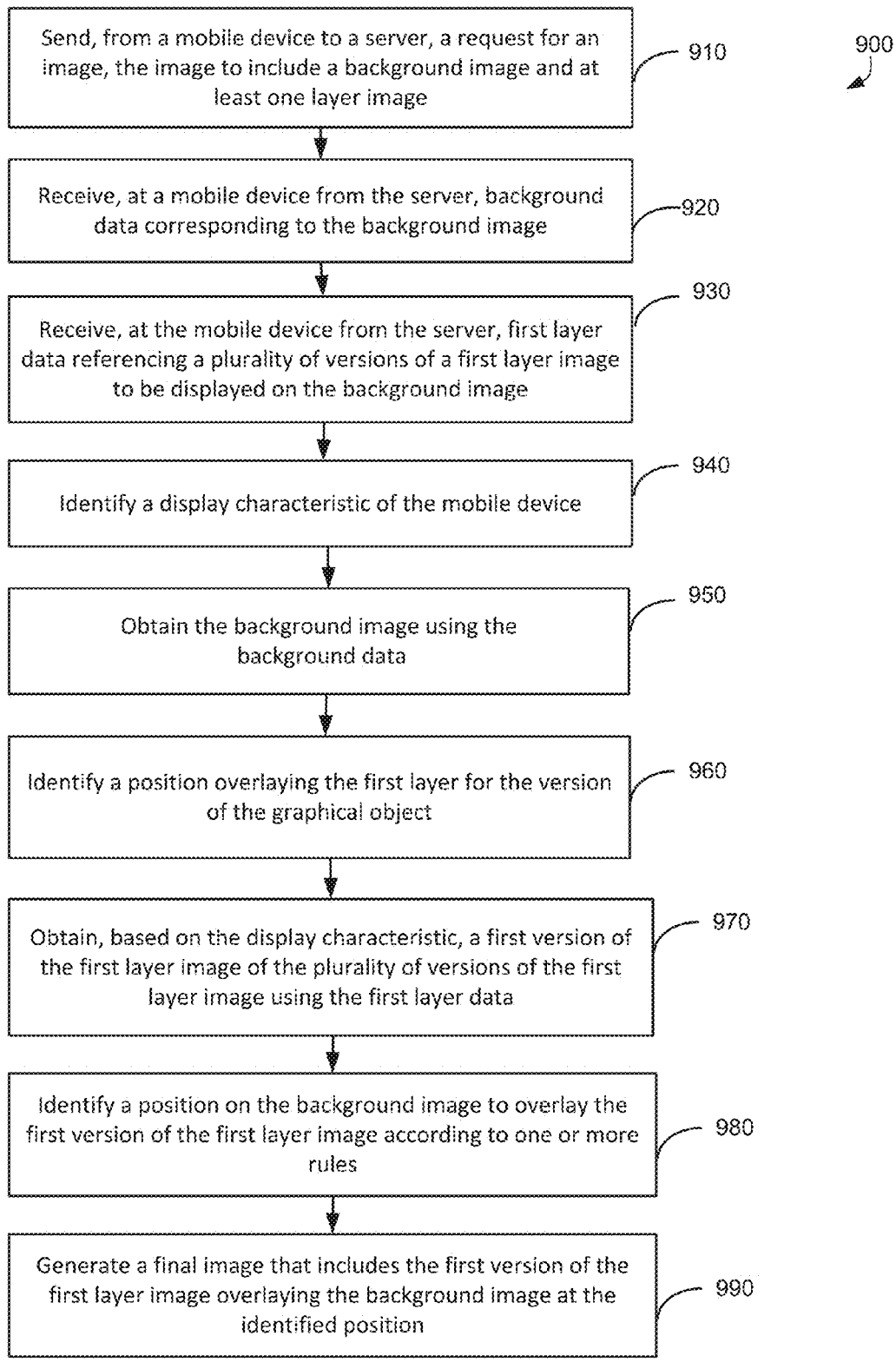
FIG. 9 is a flowchart of a method for enabling responsive overlays of background images, according to an embodiment.

FIG. 9 is a flowchart describing an example method of layering an image over a background image on a mobile device. The method begins at stage 910, with a mobile device sending a request for an image to a server, the image to include a background image and at least one layer image. In an embodiment, a mobile device (e.g., mobile device 730) sends a request (e.g., request 750) to a server (e.g., audio-visual server 720). After completion of stage 910, stage 920 is performed.

At stage 920, background data corresponding to the background image is received at a mobile device, from the server. In an embodiment, background data (e.g., background data 760) corresponding to the background image (e.g., background image 830) is received at the mobile device (e.g., mobile device 730), from the server (e.g., audio-visual server 720). In some embodiments, background data 760 is a link to a background image on an external system (not shown). After completion of stage 920, stage 930 is performed.

At stage 930, a first layer data (e.g., layer data 770) referencing a plurality of versions of a first layer image (e.g., text elements 840A and 840B) are received at the mobile device from the server, to be displayed on the background image. In some embodiments, layer data 770 is a link to a layer data on an external system (not shown). After completion of stage 930, stage 940 is performed.

At stage 940, a display characteristic of the mobile device is identified. In an embodiment, a display characteristic (e.g., screen size, portrait of landscape orientation, aspect ratio, and other similar characteristics) of display 790 of the mobile device is identified. After completion of stage 940, stage 950 is performed.

At stage 950, the background image is obtained using the background data. In an embodiment, a background image (e.g., background image 830) is obtained from background data (e.g., background data 760). After completion of stage 950, stage 960 is performed.

At stage 960, a position overlaying the first layer is identified for the version of the layer image. In an embodiment, a position overlaying the first layer is identified (e.g., the position of logo 850A or 850B) for the version of the layer image (e.g., logo 850A or 850B) is identified. After completion of stage 950, stage 960 is performed.

At stage 970, based on the display characteristic, a first version of the first layer image of the plurality of versions of the first layer image is obtained using the first layer data. In some embodiments, the first version is selected at a mobile device (e.g., by logic performed by handheld controller 710 in mobile device 730), and/or the first version is selected at a different location (e.g., by logic performed at audio-visual server 720). In some embodiments, server 720 specifies a version to use, and/or the display characteristic is analyzed based on criteria, and the best version of available layer images is selected. After completion of stage 970, stage 980 is performed.

At stage 980, a position on the background image is identified to overlay the first version of the first layer image according to one or more rules. In an embodiment, a position on the background image (e.g., the position of logo 850A or 850B stored as respective layer image versions 780A or 780B) is identified to overlay the first version of the first layer image (e.g., logo 850A or 850B) according to one or more rules (e.g., rule 775 received as a payload from server 720). It is important to note that, in some embodiments, background data 760, layer data 770 and/or rule 775 can be combined in the same communication received from server 720. In some embodiments, the position can be based on content in background image 830. For example, a feature of the background image (e.g., the sun in the sky) could be determined and a position in the middle of the sun could be selected at this stage. After completion of stage 980, stage 990 is performed.

At stage 990, a final image is generated that includes the first version of the first layer image overlaying the background image at the identified position. In an embodiment, a final image (the combination of layer text 840A, logo 850A and background image 830) is generated that includes the first version of the first layer image overlaying the background image at the identified position. After completion of stage 990, the final image can be displayed (e.g., as shown on the display of mobile device 810A in FIG. 8A).

IV. Grid Navigational User Interface

Figure 10:
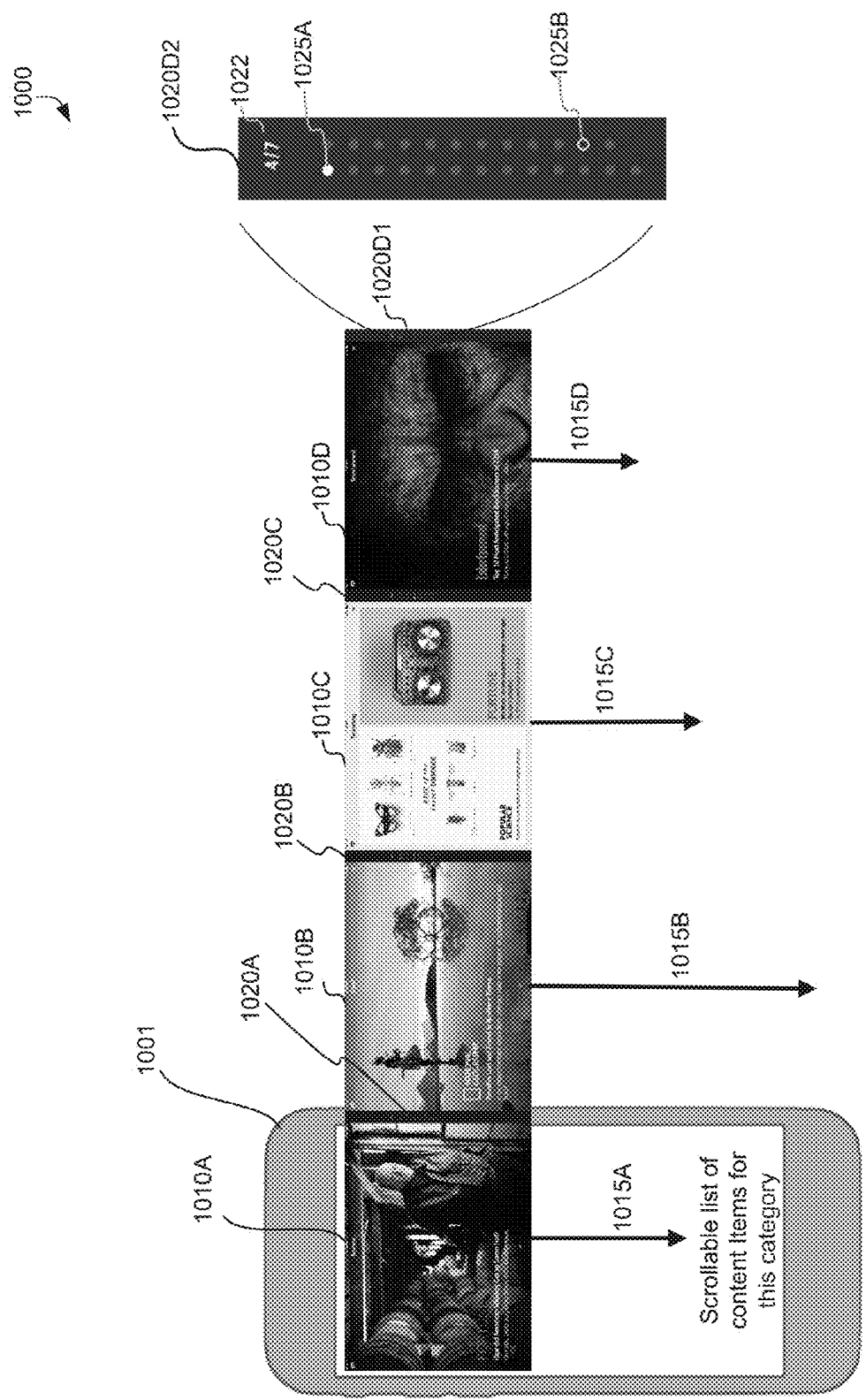
FIG. 10 depicts content displayed in a grid-like interface having navigation indicators, used by some embodiments.

FIG. 10 depicts an approach, used by some embodiments, to display content in a grid-like interface, this interface allowing navigation in multiple dimensions.

For example, in some embodiments, a 2D grid 1000 is utilized (e.g., to show promotional content—e.g., posters/titles—for audio-visual content), such grid, for example, may have categories of content, e.g., Fortune 1010A, National Geographic 1010B. In the 2D grid 1000 scrolling can also be done vertically to access content related to the respective categories, e.g., depicted by respective arrows 1015A-1015D. To illustrate how categories are shown, FIG. 10 includes mobile device 1001. The screen of mobile device 1001 shows an example approach to showing one category at a time, with a user being able to gesture to the right or left to access different categories.

In some embodiments, the 2D grid may appear "infinite" and thus be configured to again come back to a topmost grid item after the user scrolls below a bottommost grid item, for example (and the same for horizontal scrolling).

In some embodiments, the user interface is modified with navigational progress elements 1020 to illustrate where, in 2D grid 1000, the currently-displayed content is related to the beginning and end of the available content within the 2D grid 1000. In some embodiments, navigational progress elements are displayed between panels of the grid as the user navigates from one panel to the next of the grid. For example, as a user "scrolls" right to replace one panel from a content category with another panel of the same content category, a navigational progress element may be included between the panels. This transitional space between the category panels as they are being switched by a gesture, is conventionally "dead space," not used for any useful information. In some embodiments, a navigation bar is included that shows information about progress and/or placement within the 2D grid 1000.

Element 1020D2 is an expanded view of element 1020D1 that shows where the display is in relation to all of the available categories, e.g., display 1022 shows "4/7." The "4" in this example signifies that the fourth category (entertainment 1010D) is being displayed, and that three categories are not shown to the right. To provide navigation information with respect to content items 1015, some embodiments display two columns of indicators, e.g., indicators 1025A and 1025B. In this example, the leftmost indicator 1025A indicates the navigation for category to the left. Returning to the example shown, because indicator is highlighted at a first mark, the category to the left (e.g., 1010C) is currently set to display (or is currently displaying) the first content item for the category. Continuing the example configuration of indicator 1025A, because the indicator has 13 marks, the category has 13 content items for display. Similarly, with category 1010B, having 12 marks, with a highlighted mark at the 11$^{th}$ mark, there are 12 content items available, and the view display is set to show (or is showing) the 11$^{th}$ item.

In some embodiments, navigational progress element 1020 may comprise a "progress bar" type element or "slider bar" type element that displays a horizontal or vertical line, and may include a current position indicator showing where in that line the user is located. For example, as a user navigates horizontally from a 10$^{th}$ element/panel to an 11$^{th}$ element/panel of 100 elements/panels available in that row of content, the navigational progress element may comprise a horizontal bar with a current position indicator (e.g., icon, etc.) that is at a location of the line approximately one-tenth of the way across—thus, it corresponds to the current location of the user (between the 10$^{th}$ and 11$^{th}$ panel) at approximately one-tenth of the way across the 100 horizontal content panels. As noted above, in some embodiments, this navigational progress element 1020 can appear in the space between two category panels during a transition gesture.

Figure 11:
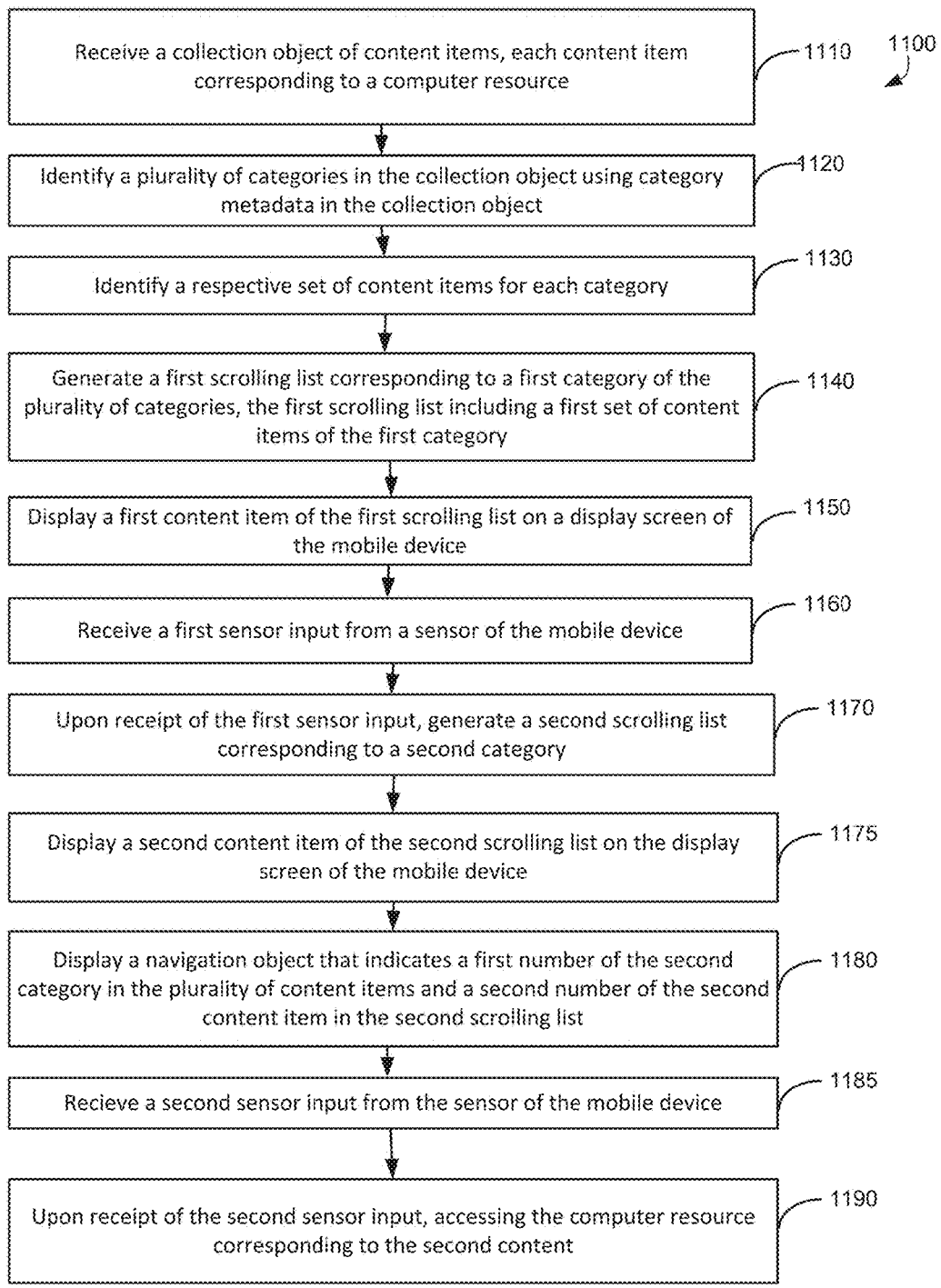
FIG. 11 is a flowchart of a method for enabling the display of resources in a grid-like interface, according to an embodiment.

FIG. 11 is a flowchart of a method 1100 of enabling access to computer resources using a grid-navigation system. In stage 1110, a collection object of content items is received, each content item corresponding to a computer resource. In an embodiment, a collection object of content items is received (e.g. represented by pictures 1010A-1010D), each content item corresponding to a computer resource (e.g., available at AV server 720). After stage 1110 ends, stage 1120 is performed.

In stage 1120, a plurality of categories in the collection object are identified using category metadata in the collection object. In an embodiment, a plurality of categories (e.g., categories 1010A-1010D) in the collection object are identified using category metadata in the collection object. After stage 1120 ends, stage 1130 is performed.

In stage 1130, a respective set of content items is identified for each category. In an embodiment, a respective set of content items (e.g., content items 1015A-1015D) is identified for each category. After stage 1130 ends, stage 1140 is performed.

In stage 1140, a first scrolling list is generated corresponding to a first category of the plurality of categories, the first scrolling list including a first set of content items of the first category. In an embodiment, a first scrolling list (e.g., shown displayed in a screen of mobile device 1001) is generated corresponding to a first category of the plurality of categories, the first scrolling list including a first set of content items of the first category. After stage 1140 ends, stage 1150 is performed.

In stage 1150, a first content item of the first scrolling list is displayed on a display screen of the mobile device. In an embodiment, a first content item of the first scrolling list is displayed on a display screen of the mobile device (e.g., mobile device 1001). After stage 1150 ends, stage 1160 is performed.

In stage 1160, a first sensor input is received from a sensor of the mobile device. In an embodiment, a first sensor input (e.g., from the screen of mobile device 1001) is received from a sensor of the mobile device. After stage 1160 ends, stage 1170 is performed.

In stage 1170, upon receipt of the first sensor input, a second scrolling list corresponding to a second category is generated. In an embodiment, upon receipt of the first sensor input, a second scrolling list (e.g., scrolling list 1015B) corresponding to a second category (e.g., category 1010B) is generated. After stage 1170 ends, stage 1175 is performed.

In stage 1175, a second content item of the second scrolling list is displayed on the display screen of the mobile device (e.g., mobile device 1001). In an embodiment, a second content item of the second scrolling list is displayed on the display screen of the mobile device. After stage 1175 ends, stage 1180 is performed.

In stage 1180, a navigation object is displayed that indicates a first number of the second category in the plurality of content items and a second number of the second content item in the second scrolling list. In an embodiment, a navigation object (e.g., navigation object 1020A) is displayed that indicates a first number of the second category in the plurality of content items and a second number of the second content item in the second scrolling list. As noted above, in some embodiments, navigation object 1020A can be shown during the swiping gesture between categories 1010A and 1010B. After stage 1180 ends, stage 1185 is performed.

In stage 1185, a second sensor input is received from the sensor of the mobile device. In an embodiment, a second sensor input is received from the sensor of the mobile device (e.g., mobile device 1001). After stage 1185 ends, stage 1190 is performed.

In stage 1190, upon receipt of the second sensor input, the computer resource corresponding to the second content is accessed. In an embodiment, upon receipt of the second sensor input, the computer resource (e.g., a resource available on AV sever 720) corresponding to the second content is accessed.

V. Dimensional Image Expansion Using Fading and Reflective Techniques

Figure 12:
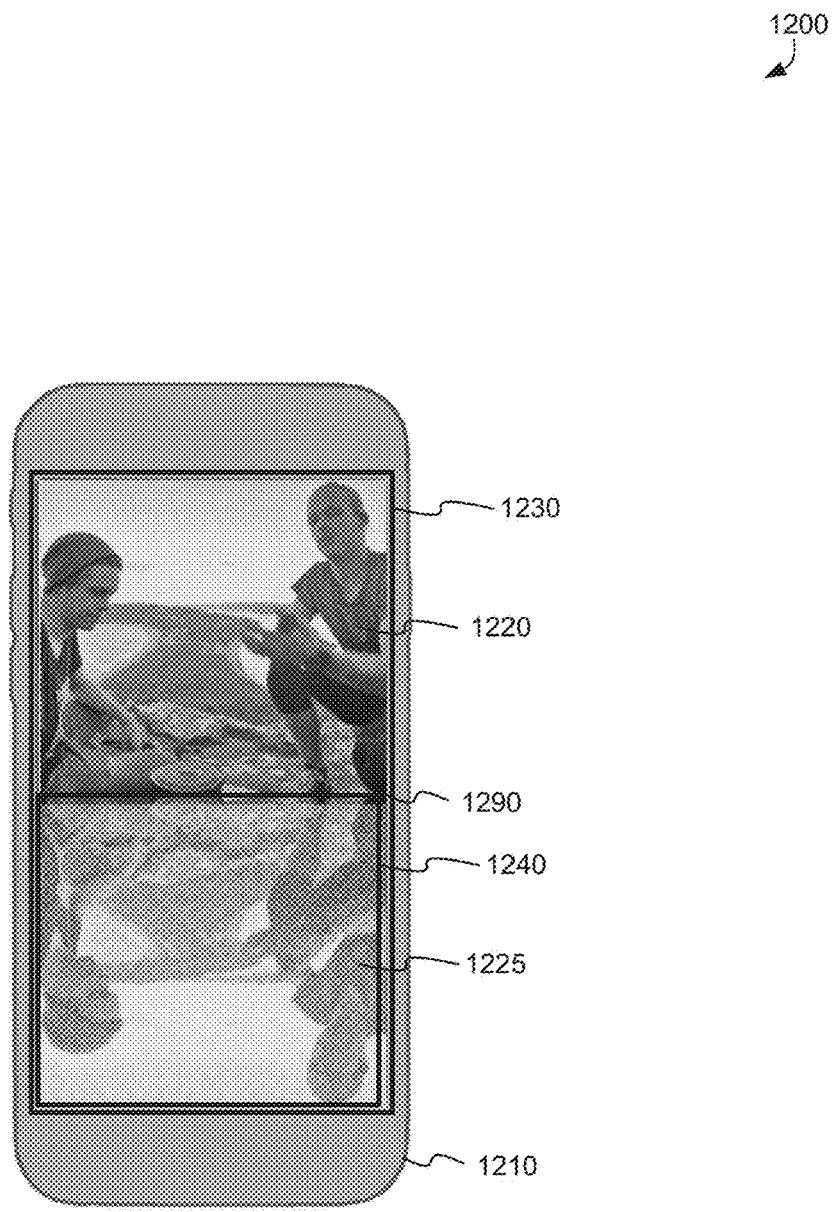
FIG. 12 depicts a mobile device having a content image and an image to be displayed in a blank space of the interface, according to an embodiment.

FIG. 12 depicts example graphics to be displayed (e.g., video and/or still content) overlaid on top of a mobile device screen profile. As described above, in some embodiments, the system may be configured to provide user interfaces to different types of client devices, and may possibly rely upon graphical content from one or more third parties.

For creating consistent user interfaces, the system may utilize graphical elements of a particular shape. For example, in some user interfaces, a 500×500 pixel graphic (as a simple example) location may be utilized. However, in some circumstances the image that is to be displayed within the graphic location may be of a different size—different height and/or different width. Further, in some circumstances, the width or length of the image may be less than the desired image location (e.g., a 200×500 image to fit in the 500×500 image location). Some systems attempt to remedy this problem by leaving whitespace in the un-used pixel locations, and some systems attempt to remedy this problem by expanding/contracting the source image in one or more dimensions. However, these solutions can waste pixel space, distort the source image, etc.

Accordingly, some embodiments automatically create, for a source image, a corresponding image to be displayed that is wider or taller by utilizing reflection techniques and/or fading techniques in a horizontal or vertical fashion. Accordingly, images can fill a larger space even though the source image itself was not originally the proper size.

In the examples shown, image 1220 is received by mobile device 1210 and is set to be placed in frame 1230 on the screen of mobile device 1210. As shown, frame 1230 is approximately twice as large as image 1220, and a blank space 1240 (shown as filled in FIG. 12) would result, in a conventional approach. It is important to note that, when received, image 1220 may be larger than the visible portion shown in FIG. 12. In some embodiments, frame 1230 can be used to crop the size of image 1220 before the image expansion approach described herein is performed.

Thus, to address empty spaces (e.g., 1240), some embodiments will transform the source graphics (e.g., image 1220), resulting in one or more transformed image pieces (e.g., fill image 1225) to fill in empty spaces (e.g., blank space 1240). One type of transformation performed by some embodiments creates a mirror image of a portion of the graphic, this mirror image being, in some embodiments, aligned horizontally with the image. An example of this is shown in FIG. 12, where fill image 1235 is generated by a transformation of image 1220. This transformation, as shown in FIG. 12, can result in an image that simulates a reflection of image 1220, e.g., fill image 1225. As also shown in FIG. 12, in some embodiments, fill image 1225 can be faded as well. Another transformation of fill image 1225 that can be used involves adjusting the gradient colors of the fill image. One having skill in the relevant art(s), given the description herein, would appreciate that a many different variations of this approach can be used to achieve the benefits described herein.

Accordingly, in some embodiments, an attractive image results that does not degrade and/or distort the quality of the source image itself, can be generated by some embodiments. In addition, the original user interface design is not affected (i.e., the image fills the entire allocated image location, and thus all other user interface elements may similarly exist in their originally-designated positions).

In some embodiments, a user can interact with the fill image to fine tune different aspects, e.g., by zooming in, zooming out, choosing visible area from the original image by dragging the thumbnail, and/or applying different levels of gradient.

Figure 13:
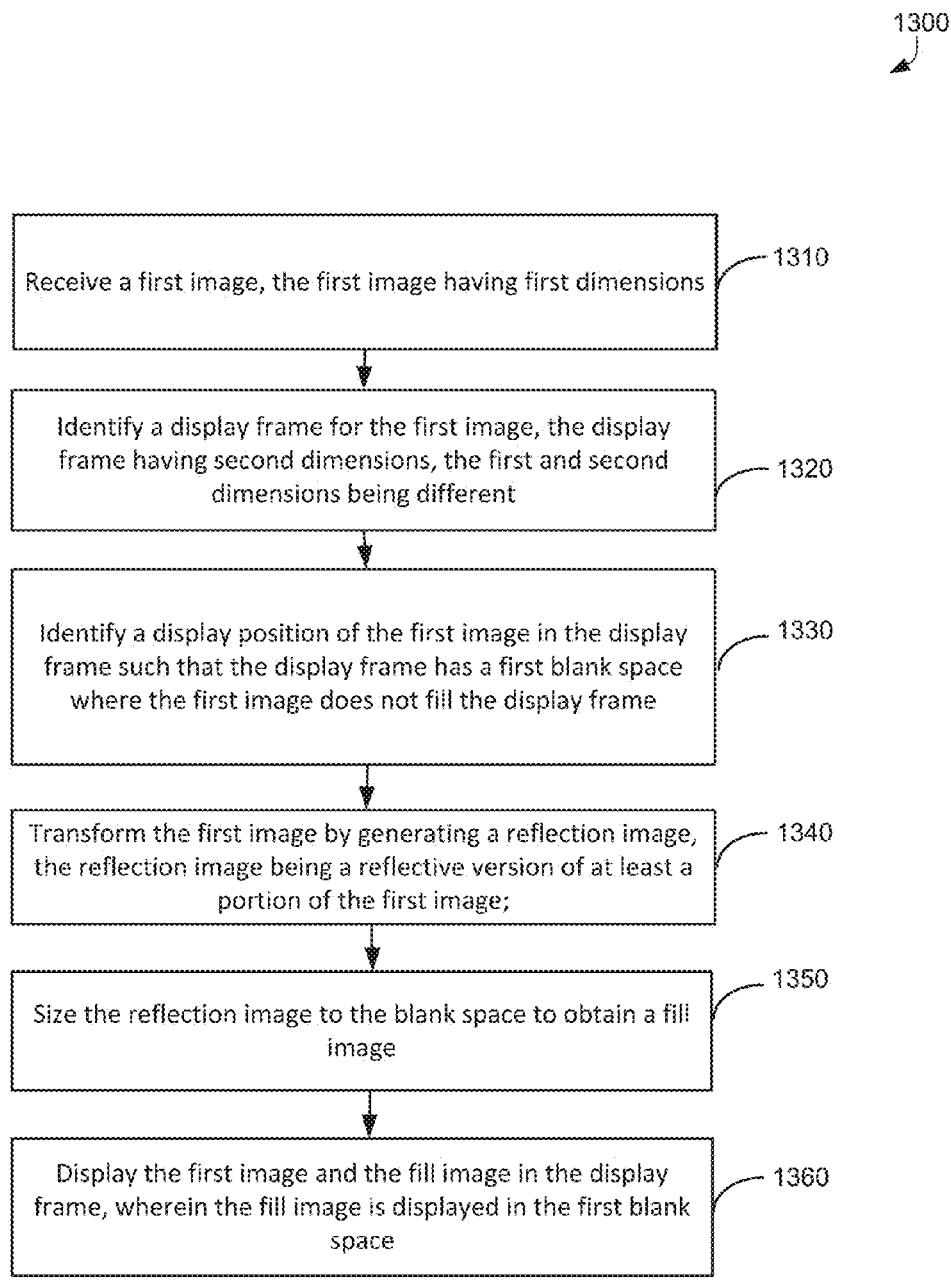
FIG. 13 is a flowchart of a method for enabling responsive overlays of background images, according to an embodiment.
Figure 14:
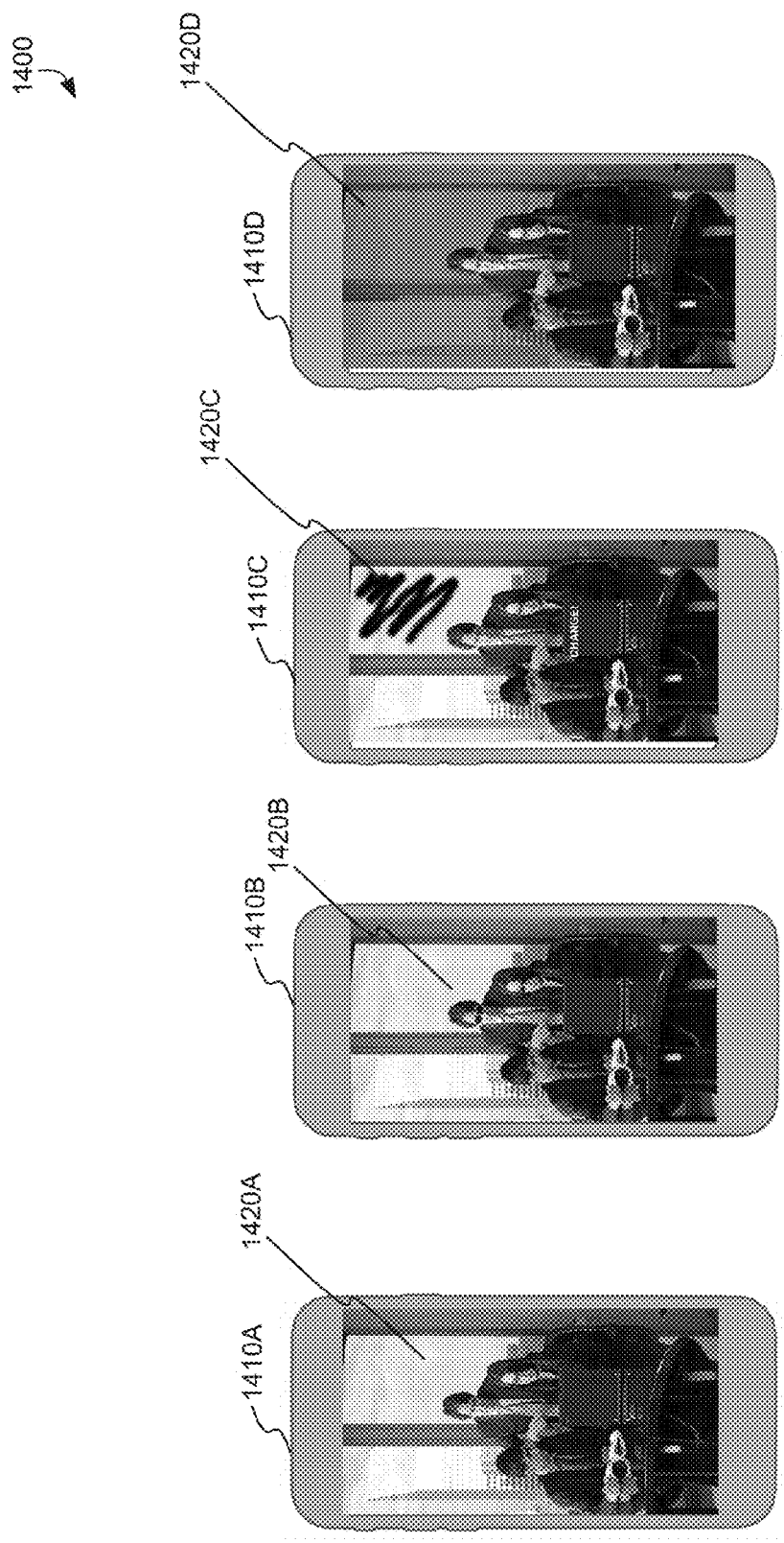
FIGS. 14A-14D show a sequence of time-sensitive content items on a mobile device, according to an embodiment.

FIG. 13 depicts a flowchart of a method of expanding content on a mobile device to fill blank spaces in a larger frame.

At stage 1310, where a first image is received, the first image having first dimensions. In an embodiment, a first image (e.g., image 1220) is received (e.g., at mobile device 1210), the first image having first dimensions (e.g., the dimensions of image 1220 shown in FIG. 12). When stage 1310 ends, stage 1320 is performed.

At stage 1320, a display frame for the first image is identified the display frame having second dimensions, the first and second dimensions being different. In an embodiment, a display frame (e.g., display frame 1230) for the first image (e.g., image 1220) is identified, the display frame having second dimensions (e.g., the dimensions of display frame 1230), the first and second dimensions being different (e.g., display frame 1230 is shown as being approximately twice the size of image 1220). When stage 1320 ends, stage 1330 is performed.

At stage 1330, a display position of the first image in the display frame is identified such that the display frame has a first blank space where the first image does not fill the display frame. In an embodiment, a display position of the first image in the display frame is identified (e.g., image 1220 is positioned at the top of display frame 1230) such that the display frame has a first blank space (e.g., blank space 1240) where the first image does not fill the display frame. When stage 1330 ends, stage 1340 is performed.

At stage 1340, the first image is transformed by generating a reflection image, the reflection image being a reflective version of at least a portion of the first image. In an embodiment, the first image is transformed by generating a reflection image, the reflection image (not shown in FIG. 12)

being a reflective version of at least a portion of the first image (e.g., FIG. 12 shows fill image 1225, which results from the reflection image, as being a reflective version of image 1220). When stage 1340 ends, stage 1350 is performed.

At stage 1350, the reflection image is sized to the blank space to obtain a fill image. In an embodiment, the reflection image (not shown in FIG. 12) is sized to the blank space (e.g., sized to fit blank space 1240) to obtain a fill image (e.g., fill image 1225). When stage 1350 ends, stage 1360 is performed.

At stage 1360, the first image and the fill image are displayed in the display frame, wherein the fill image is displayed in the first blank space. In an embodiment, the first image (e.g., image 1220) and the fill image (e.g., fill image 1225) are displayed in the display frame (e.g., frame 1230), wherein the fill image is displayed in the first blank space (e.g., blank space 1240).

VI. Time-Evolving Content

FIGS. 14A-14D depict respective client devices 1410A-C (e.g., similar to client device 102) having respective display screens with graphics 1420A-D having content evolution zones, according to some embodiments. In some embodiments, to potentially spark interest in content (e.g., advertising), some embodiments have evolution zones 1420A-1420D, such zones being a location for changes within the displayed graphic. Such changes can cause a graphic to have additional impact, at least because when viewed multiple times, the changes can cause interest in what changes will come next. To illustrate the evolution of the displayed content in some embodiments, FIGS. 14A-14D are a sequence of graphics with evolution zones displayed on client device 1410A-1410D. It should be understood that the content evolution zones shown are simple examples, and that content evolution zones can be as small as a pixel or as large as the entire display screen.

To implement content evolution zones 1420A-1420D, each evolution in the content that occurs are considered different "views" of the content (these are referred interchangeably herein as 1420). Thus, the first time the content is displayed, a first view 1420A is displayed. Note, in this example, view 1420A has a blue sky, none of the people in the image have sunglasses, and it is daytime. When the content is displayed again (e.g., by scrolling back to the item, by navigating a menu back to the content item, etc.), the second view 1420B is displayed. In this view, two of the participants have sunglasses on. As the evolution continues with 1420C and 1420D, the sky turns cloudy, and the scene is shown at night.

As illustrated by the previous examples, each of the views in some embodiments, include similar graphic content, and thus the content item appears to "evolve" and change in small ways. In another example, a first view of the content item may be an empty sports stadium, a second view of the content may be a partially-full (i.e., the crowd partially fills the area) sports stadium, a third view of the content may be a full sports stadium, a fourth view may be a full sports stadium with one or more sports teams visible on the playing surface, etc. In other embodiments, though, the content may change more significantly.

In some embodiments, the views 1420 are generated ahead of time and transferred from audio-visual streaming system 110 to client devices 1410. The sequential display of views may continue in some embodiments for repeated displays of the content, the sequence only being limited by how many "views" of the content are configured. In some embodiments, the order the views are displayed can be changed for subsequent displays.

In some embodiments, the views 1420A-1420D are dynamically generated (either at audio-visual system 110 or client device 102). This approach can generate results similar to the examples described above, or can generate views that reflect different values, e.g., time of day, weather, photos available on client device 102, and/or other similar sources. For example, in the stadium example above, the stadium could be depicted as filled to the extent a real stadium is filled. When using this approach with the first example, the time of day and the weather shown in the views could reflect the actual time of day and weather.

In some embodiments, one or more of the views 1420 shown are static (i.e., non-motion content such as a still frame), and others views include motion (i.e., video or animation similar to the cinemagraphs discussed above).

VII. Techniques for Optimized Multi-Orientation Content

Figure 15:
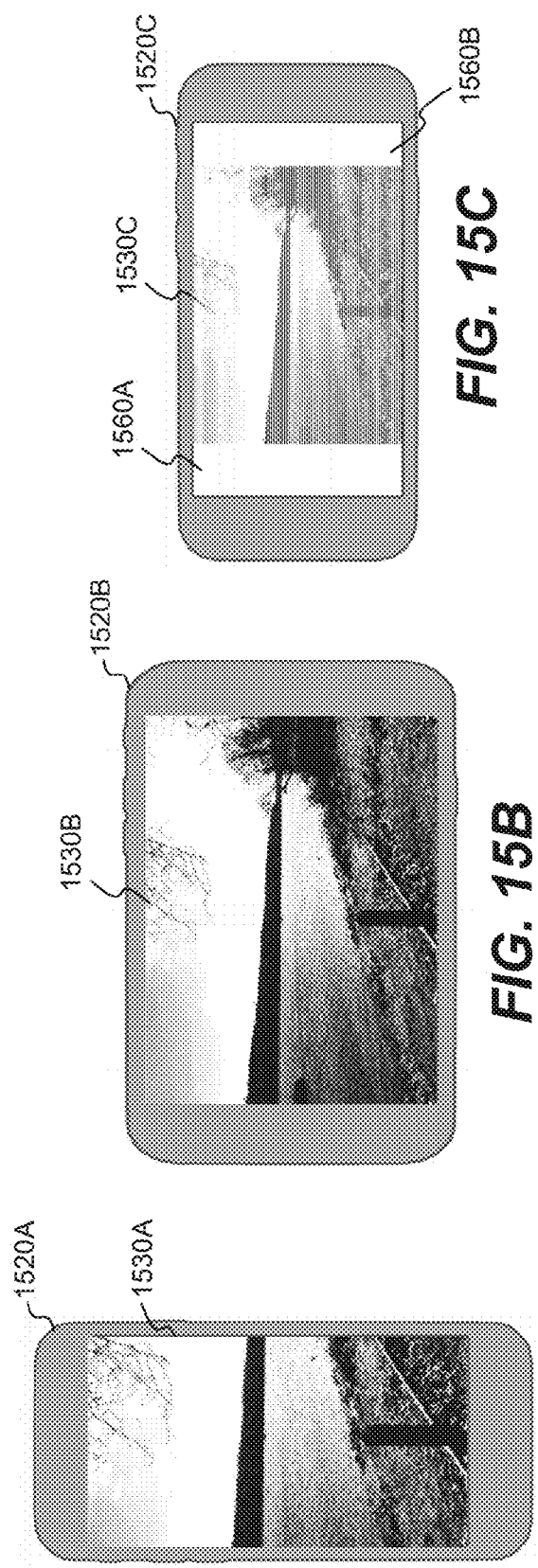
FIGS. 15A-15C illustrate mobile devices of different sizes and display orientations, according to some embodiments.

FIGS. 15A-15C illustrate mobile devices of different sizes and display orientations. In some embodiments, the audio-visual streaming system is configured to provide customized versions of content to particular client devices and display orientations. For example, the system may provide video content with an aspect ratio, resolution, etc., that is customized to the particular capabilities of a particular client device. This customized content may be for streamed videos, advertisements, etc.

For example, with a 9×16 space to fill (e.g., FIG. 15A), only a 15×9 image may be available (e.g., better suited to graphic 1530B in FIG. 15B). In some embodiments, client device 1520A transmits a request for content to a server (e.g., AV streaming server). The request may include display characteristics of the client device, such as an indication that the display is being viewed in a landscape orientation (as opposed to portrait orientation) at 1,136 pixels in width by 640 pixels in height at 326 pixels per inch (PPI). In some embodiments, the request may only include a device identifier—and the system is already aware of the device characteristics—or a user identifier, for which an associated device identifier may be identified by the recipient server.

the server can respond to the client device with a content response including a first resource identifier (e.g., URL) for content (e.g., an advertisement, a requested video, etc.) that is customized to the determined display characteristics (e.g., landscape mode at the stated resolution).

In addition to this URL, the response may further include a second "alternate" or "backup" URL to a different resource for the same content item (e.g., the same ad or video) that has been custom created/processed for a different orientation of the same display. For example, the second URL may identify a different file of the same content that is optimized for a portrait mode with the same resolution (e.g., 640 pixels in width by 1136 pixels in height at 326 PPI).

In response, the client device will issue a request for the first resource, and receive data for this first resource. If the user then re-orients the client device (e.g., to now be in portrait mode), the client device may automatically transmit a request using the second URL to retrieve the same content but as part of a different resource that is tailored for the new orientation.

Upon receipt of this content, the client device will begin playing it. Accordingly, the client device is presented with orientation-specific content—as opposed to other systems in which a content item is merely rotated (with black bars added, for example), or as opposed to other systems in which a different content item is retrieved (e.g., a different advertisement is suddenly displayed).

In some embodiments, the client device may request both resources (i.e., the resources identified by the first URL and the second URL) before the second resource is even (or ever) displayed. Requesting both resources can create a more seamless transition upon the occurrence of the orientation change, at the expense of increased network (and memory) utilization. Thus, this decision may be flexibly configurable based upon the particular needs of the system and users.

In some embodiments, multiple URLs for multiple content items may be identified for each of the orientations within the response from the server. For example, a first content URL and a first overlay URL (of content to be overlaid on top of the other content, such as a logo and/or text to be overlaid over a video) may be identified for a first orientation, and similarly a second content URL and a second overlay URL may be identified in the response for a second orientation. Of course, many groupings of content items may be identified for each orientation.

Accordingly, in some embodiments, the initial request for a content from the client device may be transmitted to an ad server, which transmits the response to the client device with the multiple primary/backup URLs. These URLs may point to content server(s), and thus embodiments reduce the need to continually query the ad server for updated content information—only the content server(s) are involved.

In another example, mobile device 1520A, shown in portrait orientation in FIG. 15A, can be used in landscape orientation, as shown in FIG. 15C. In this circumstance, some embodiments can request a size to be displayed in the orientation, but, to display the entire graphic 1530C, empty spaces 1560A and 1560B must be included. These spaces can be handled as discussed below with the description of FIGS. 8A and 8B.

VIII. Additional Features

The present disclosure relates generally to processing techniques in audio-visual streaming systems. In some embodiments, an audio-visual streaming system may include an application server and storage server, which can rely upon a content distribution network (CDN), to provide user interfaces for selecting audio-visual content and viewing audio-visual content. In some embodiments, the audio-visual streaming system also performs various processing techniques for providing new forms of user-customized content, including customized advertisements.

Techniques, user interfaces, and functionalities are described herein with respect to client devices and/or server devices of an audio-visual streaming system. For example, some user interfaces and functionalities are described with respect to a client application (e.g., special-purpose application or general-purpose application such as a web browser) that is part of an overall audio-visual streaming system and may play audio-visual content by interacting with backend servers of an audio-visual streaming system. However, unless expressly indicated herein, the disclosed techniques, user interfaces, and functionalities may be utilized in other environments apart from audio-visual streaming systems, including but not limited to content (e.g., multimedia, application, text, etc.) distribution systems and other general or special-purpose applications.

Embodiments disclosed herein provide an online digital content platform that can distribute media content on a free basis and/or on a paid, subscription basis. Embodiments may be designed and configured to provide users with a simple, elegant, and convenient way to access premium content from any location—at home or on the go. In some embodiments, the audio-visual streaming system provides a service including access to high quality video, posts, and/or images from a variety of PC/mobile browsers and device applications. Some embodiments feature elegant posts with text, images, and/or video written by content creators for the users.

According to some embodiments, the audio-visual system may provide access to optimized "About Us"/"Details"/"Bio" views associated with media content that includes text, images, and/or video written by content creators. Embodiments may also provide user-specific personalized home feeds, recommendation hubs, and identifiers of related and featured content for content discovery.

Some embodiments feature an instant search functionality to quickly access content from a media catalog, and may provide instant access to preferred media content through user "following" of categories, channels, shows, artists, etc.

In some embodiments the audio-visual streaming system provides the ability for users to "like" and/or "comment" upon content to allow users to have conversations around the content being consumed, perform direct sharing of video-system activities to third party websites, social networks (e.g., Facebook), communication platforms (e.g., Twitter), blogs, etc. Further, some embodiments implement simple playback controls within video-streaming system user interfaces that allow users to perform a variety of media-content related tasks, including but not limited to controlling playback (e.g., rewind 10 seconds), enter full-screen or partial-screen audio-visual content display, change the quality of playback, view thumbnails while hovering over a media-content timeline, etc.

In some embodiments, the audio-visual system protects audio-visual content in various ways. In an embodiment, audio-visual files may be provided by a cloud storage server, which may be secured by strict access control rules, such that content is accessible to only production machines/services that are behind a virtual private network (VPN) or locked via a particular range of network addresses (e.g., set of IP addresses).

Some embodiments may be configured to utilize a Content Delivery Network (CDN in which no video content is directly accessible on the CDN. Instead, in some embodiments, a unique, signed, and limited-life URL (retrievable by authenticated users only) is required in order to access any video file on the CDN.

In some embodiments, encryption keys are utilized but are never stored in application code. For example, all encryption keys may be stored in secured portions of a content server, and strict access control rules/roles are configured to allow only production services that are behind a VPN, for example, to access these keys.

Further, in various embodiments, security tokens are versioned, rotatable, expirable, and are never cached. In some embodiments, all communications between client devices and servers occurs securely using encrypted communications (e.g., using TLS/SSL, such as via HTTPS). Additionally, in some embodiments, video content is encrypted on transport using TLS/SSL, AES, or similar encryption techniques.

In some embodiments, concurrent access to video content is limited on a per user basis, and geographic access to particular audio-visual content may be restricted.

In some embodiments, playback (on a client device) occurs using a "device application," which may be a special-purpose application (e.g., an operating system specific application) specific to the audio-visual streaming system, or may be a more general purpose application such as a web browser, for example.

In some embodiments, device applications are securely distributed using encryption (e.g., AES 128-bit encryption, etc.) and stored in secure, protected memory on the client device, which can prevent the application from being decompiled, reverse engineered, or used in an unauthorized manner.

In some embodiments, requests for audio-visual content CDN URLs require a valid device identifier, which can allow for the system to track and/or disable a specific device or class of devices if necessary. In some embodiments, video files will be played using native audio-visual playback components provided by underlying hardware, operating systems, software libraries, etc.

In some embodiments, client devices may be configured to never store any portion of streamed audio-visual content files in persistent storage, but instead only secured and temporary application memory will be used to cache small portions of the video for smooth playback.

In some embodiments, video output interfaces of client devices may be configured to disable copy and unauthorized retransmission. For example, in some embodiments, analog output may be protected by CGMS-A (set to "Copy Never") and digital output may be protected by HDCP, for example.

A. Automated Video Content Representations Using Auto-Generated Cinemagraphic Techniques In some embodiments, cinemagraphs are moving images in which a minor and repeated movement occurs. Cinemagraphs, which are usually published in an animated GIF format, can give the illusion that the viewer is watching a video. Cinemagraphs are commonly produced by taking a series of photographs or a video recording, and using software, compositing the photographs or the video frames into a seamless loop of sequential frames. This is done such that motion in part of the subject between exposures (for example, a person's blowing hair) is perceived as a repeating or continued motion, in contrast with the stillness of the rest of the image.

In some embodiments, the audio-visual streaming system may utilize automatically generated cinemagraphs in user interfaces (e.g., as a "poster" for a content item), etc. For example, a cinemagraph may be created based upon images from a video to create a motion poster (or "mopo") that may entice users into watching the content by providing a striking insight into a portion of the content from the movie. However, the generation of cinemagraph requires significant manual interactions (i.e., instruction/direction from human users), as they have typically required a human to identify a range of images from a video asset that are well suited to create the cinemagraph, and then manually perform tasks to identify what portions of the image will move and/or what portions will remain static.

In some embodiments, a user interface may be provided to allow for a user to manually select a video clip (i.e., a beginning point and ending point from a video asset) to use as a motion poster (or cinemagraph) for the video asset.

The user interface may include a timeline view as well as a view of the video asset itself—for example, when a slider of the timeline is at a halfway point in the timeline, a corresponding frame of the video asset may be displayed in the video view. The user may select two points in the timeline, for example, to indicate a beginning frame and an ending frame from the video asset that delineate the beginning of the frames and the end of the frames from the video asset (i.e., a selected range of frames) that should be used to create a cinemagraph. The system may then perform image analysis using this selected range of frames to determine which continuous portions of these frames exhibit motion, and automatically select these portions as the "motion" portions of a resulting cinemagraph and select, from one frame, the rest of the frame that is not a motion portion to be used as the "still" portion of the resulting cinemagraph.

In some embodiments, the system may be configured to attempt to automatically create cinemagraphs/motion posters for video content based on video characteristics. In these configurations, no manual human interaction is required to select the range of selected frames—instead, the system may algorithmically attempt to identify the best possible frames to result in the best possible cinemagraph.

For example, in an embodiment, the system is configured to detect a range of frames with one or more of the following: where one person is identified (e.g., using image recognition techniques known to those of skill in the art) that stays within the view for the entire range of frames, where the entire range of frames only has minimal background (i.e., non-character portions) changes (e.g., differences in color/brightness that fall below a defined threshold), where there is a certain determined focal point of the images, etc. The system may then continue, as described above, to generate the cinemagraph using this automatically selected range of frames.

However, in some configurations it may be difficult to automatically generate a cinemagraph with a smooth "loop" such that the motion appears continuous. For example, if the selected motion begins in one portion of the frame and ends in another portion of the frame (as opposed to ending in the same portion), a looping (or repetition) of the frames will appear disjointed/or "jerky." Some embodiments are able to avoid this problem.

First, in some embodiments, the system is configured to automatically identify multiple different "selected ranges of frames" (each as described above), create a cinemagraph using each, and combine these multiple different cinemagraphs into one cinemagraph. For example, each of the selected clips (or selected range of frames) may be identified that have a similar movement speed, or a similar emphasis upon a person within the frames, etc.

Second, in some embodiments, a cinemagraph is generated with a selected range of frames (whether from user input or automatically determined by the system) by, at the end of the selected range of frames, looping the motion poster by reversing frame playback.

In some embodiments, cinemagraphs may be generated for audio-visual content items and be utilized (i.e., displayed) in system navigational user interfaces (e.g., on a client device, while browsing through available video content items) as a "teaser" or advertisement for a particular audio-visual content item.

B. Time & Location Integration

In some embodiments, certain items of content in a user interface may be adapted based upon a detected time and/or location of the client device/end user. Accordingly, in some embodiments, a determined user client device date/time/location is detected, and used for selecting what content is to be displayed to the user.

For example, in some embodiments, an advertisement of a watch may be adapted such that the watch displays a same time as the time in the viewing location of the user. In one example, a source video asset of a watch "ticking" (i.e., having its hands moving over time) is used, and the source video is keyed such that every minute (or every second of every minute, etc.) may be identified within the video. The video (or portions thereof) may be transmitted to the client device, and upon detecting the time of the client device, the video may be started to play at the corresponding time to that of the client device. For example, assuming a time of 12:21 pm in the user location, the watch video may utilize its keys/indices to identify the frames associated with the watch showing 12:21 pm, and may begin playback of the video at that point.

C. Content Morph on Gesture

In some embodiments, additional content (e.g., text, images, etc.) is automatically provided in empty display frames (see. In some embodiments, the dimensioning of the graphics 830 and/or transformed image pieces is determined based on the additional content that is desired to be displayed. Without different solutions performed by some embodiments, these spaces would be "wasted" space in the user interface.

In another example of morphing content performed by some embodiments (not shown), when a user gestures over a panel in a user interface (e.g., a motion poster advertisement) to "remove" or "slide out" the panel (and/or "add" or "slide in" a new panel), the outgoing panel may be replaced or modified as it is being animated away. Thus, instead of continuing to display the current content of the panel being moved away (albeit in a "shrinking" capacity as it slides away), this panel is modified or replaced with a different element to draw the user's attention to the outgoing panel for a brief moment as the panel disappears. In some embodiments, this "morphing" may shift a movie poster, for example, into a branding element such as a logo or title. For example, if a first panel displays an advertisement for a soft drink, upon the user "swiping" away the panel, the panel may be overlaid with or replaced with a logo associated with that particular brand of soft drink. One having skill in the relevant art(s), given the description herein, will appreciate additional variations of the above approaches in the scope of the invention.

D. Automatic Gradient Identification

Another problem solved by some embodiments, is how to algorithmically overlay text over a graphic and maintain readability. For example, if a system is configured to overlay white text over graphics, this text may not be visible or readable if it is overlaid on top of an image that is largely white.

Accordingly, in some embodiments, one or more parts of the system (e.g., at an application server and/or at a client device) are configured to automatically determine if an image gradient layer should be applied between an image and a text overlay, and automatically determine what level of gradient (e.g., what density of gradient or what color range to include, what amount of opacity or darkness is required, etc.) should be applied.

In an embodiment, the system is configured to apply automated image analysis techniques to analyze the color and/or brightness, etc., of the portion of an image that is be overlaid with additional content (e.g., white text). With a detected color/brightness/etc. value of that area, the system determines if that value exceeds a predetermined color/brightness threshold value (possibly set based upon heuristic-based values), then the system is configured to include a gradient. In some embodiments, multiple such thresholds may be configured, such that if the detected value exceeds a first threshold a "weak" (i.e., a low-density) gradient is used, but if it exceeds a second threshold (and so on), a more "strong" (i.e., a higher-density) gradient may be used.

The system may then create an adjusted image by, for example, overlaying the top-level overlay with the gradient layer and then with the source image as the next layer—and this constructed/merged image is provided to client devices. In other embodiments, the system may simply transmit (or otherwise provide) the overlay, gradient, and source image to the client device.

E. Personalized Content Control

According to some embodiments, the audio-visual streaming system may be configured to allow users to personalize, the type and/or amount of various types of content presented by the system. In some embodiments, the system (via the client device) may present a user interface allowing users to input data to enable this personalized content types and amounts.

Figure 16:
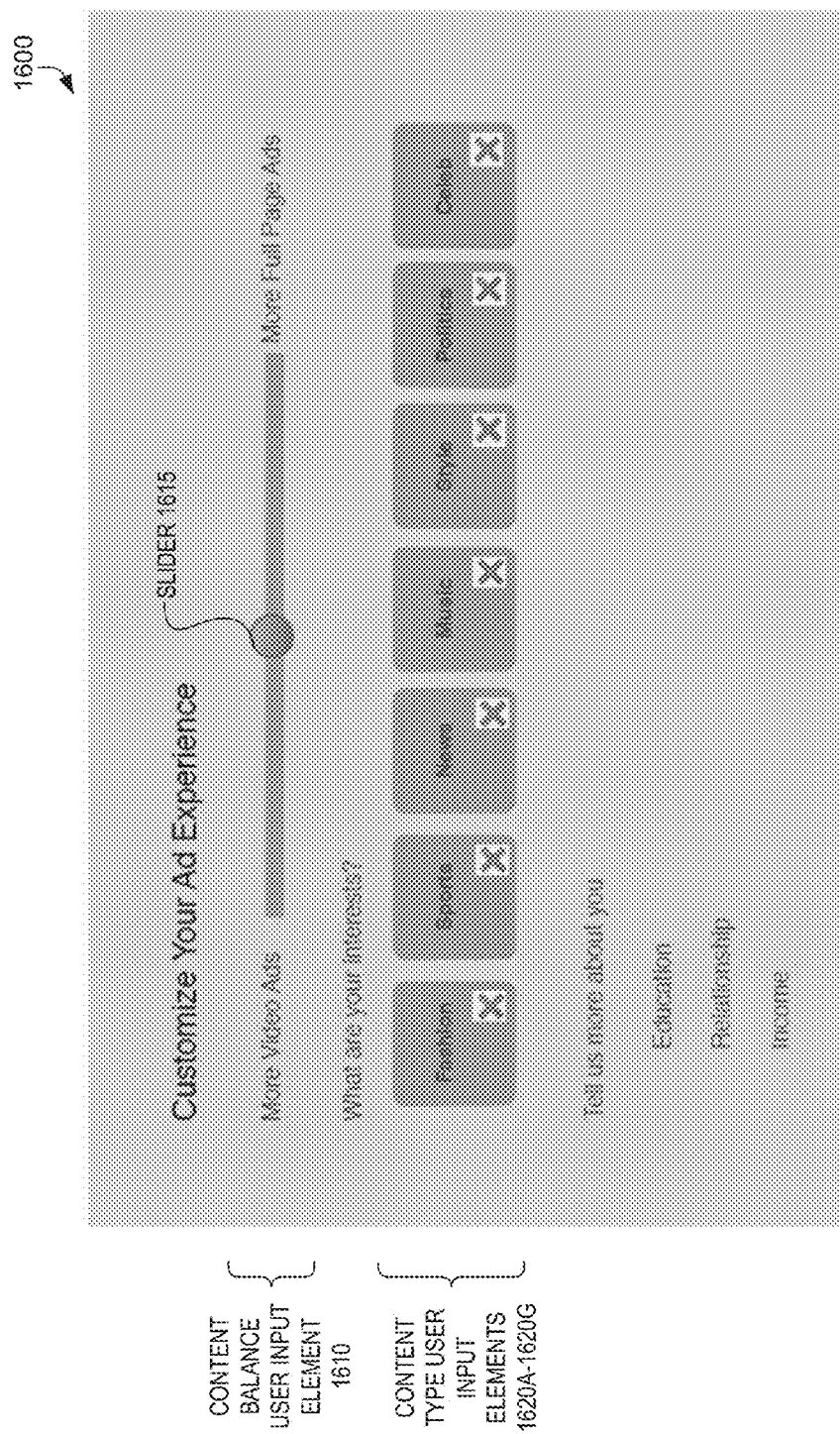
FIG. 16 illustrates a personalized content control user interface according to some embodiments of the present invention.

FIG. 16 illustrates a personalized content control user interface 1600 according to some embodiments of the present invention. In some embodiments, this personalized content control user interface 1600 is presented to a user via the user's client device via an application (e.g., audio-visual streaming system-specific application, web browser, etc.).

In the depicted embodiment, the personalized content control user interface 1600 allows a user to configure the amount and/or types of advertisements to be displayed to that particular user while interacting with the system. In some other embodiments users may similarly configure other types of content, such as the amounts/types of content recommendations. In some embodiments, the content offered can be algorithmically determined (e.g., based upon a viewer's history of consumed content compared to other users' histories of consumed content), and/or come from a set of the other users associated with a user (e.g., the user's friends, followers, etc.).

In the depicted embodiment, the personalized content control user interface 1600 includes a content balance user input element 1610, which includes a slider 1615 that the user may move from one side to the other of the content balance user input element 1610 to indicate the balance of how many video advertisements will be shown to the user compared to the number of full page advertisements will be shown. For example, when the slider 1615 is positioned (by the user) all the way at the "more video ads" side, the system may be configured to display only (i.e., 100%) video ads and no full page ads. Similarly, when the slider 1615 is positioned (by the user) all the way at the "more full page ads" side, the system may be configured to display only (i.e., 100%) full page ads and no video ads. Generally speaking, the position of the slide 1615 on the content balance user input element 1610 may be configured to change the ratio of the displayed video ads compared to full page ads, such that the further it is to one side of the content balance user input element 1610 the higher the percentage of ads of that type will be displayed.

Although the above examples indicated that a positioning of the slide 1615 at one end of the content balance user input element 1610 equates to a 100% assignment of that type (e.g., all video ads when the slider 1615 is at the left), in other embodiments the "far left" or "far right" may indicate less than 100% of that content type. For example, in some embodiments when the slider 1615 is at the far left, this indicates that 75% of the ads will be video ads, and when the slider 1615 is at the far right, this indicates that 75% (or possibly even a different percentage) of the ads will be full page ads.

In some embodiments, the personalized content control user interface 1600 may include one or more content type user input elements 1620A-1620G, which allow a user to select interests of the user, to thereby configure which content (or advertisements, etc.) will be displayed to the user. Accordingly, the user will be able to control the advertisement selection, such that advertisements that are of no interest to the user will not be displayed. In the depicted embodiment, each of the content type user input elements 1620A-1620G allow the user to indicate (here, via a checkbox user input element) whether the user is interested in the associated type—e.g., fashion 1620A, sports 1620B, news 1620C, music 1620D, style 1620E, politics 1620F, and celebrities 1620G. Of course, these interest categories are merely illustrative, and thus many other types—and more or fewer types—may be utilized in certain embodiments.

IX. Example Subsystems and Components

Any of the clients or servers may utilize any suitable number of subsystems. Examples of such subsystems or components are shown in FIG. 17, which illustrates a block diagram of an exemplary computer apparatus according to some embodiments of the present invention.

Figure 17:
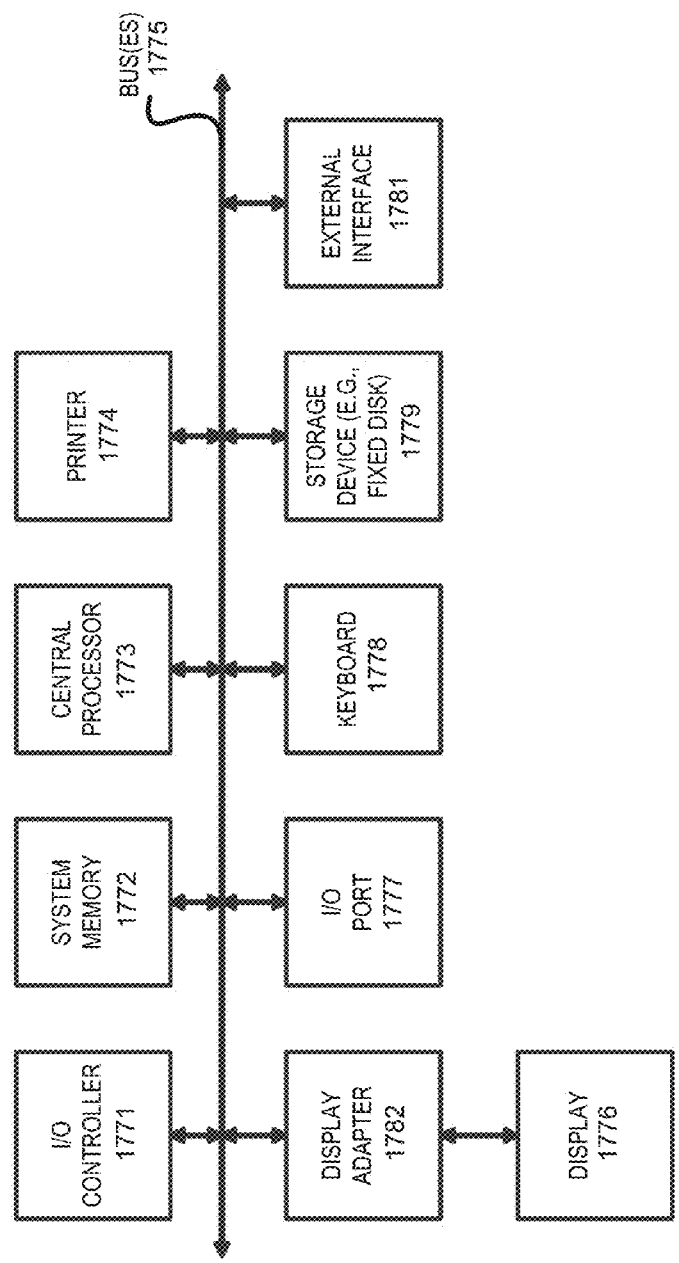
FIG. 17 illustrates a block diagram of an exemplary computer apparatus according to some embodiments of the present invention.

The subsystems shown in FIG. 17 are interconnected via a system bus 1775. Additional subsystems such as a printer 1774, keyboard 1778, storage device (e.g., or "fixed disk" such as an optical disk, magnetic disk or "hard drive," flash storage, etc.) 1779, display 1776, which is coupled to display adapter 1782, and others are shown. Peripherals and input/output (I/O) devices, which couple to I/O controller 1771, can be connected to the computer system by any number of means known in the art, such as input/output (I/O) port 1777 (e.g., USB, FireWire). For example, I/O port 1777 or external interface 1781 (e.g. Ethernet, Wi-Fi, etc.) can be used to connect the computer apparatus to a wide area network such as the Internet, a mouse input device, or a scanner. The interconnection via system bus allows the central processor 1773, which may include one or more processors, to communicate with each subsystem and to control the execution of instructions from system memory 1772 or the storage device 1779, as well as the exchange of information between subsystems. The system memory 1772 and/or the fixed disk 1779 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++, C, Python, or Perl using, for example, conventional programming techniques, functional programming techniques, or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

X. Exemplary Content Playback Request Flow

Figure 18:
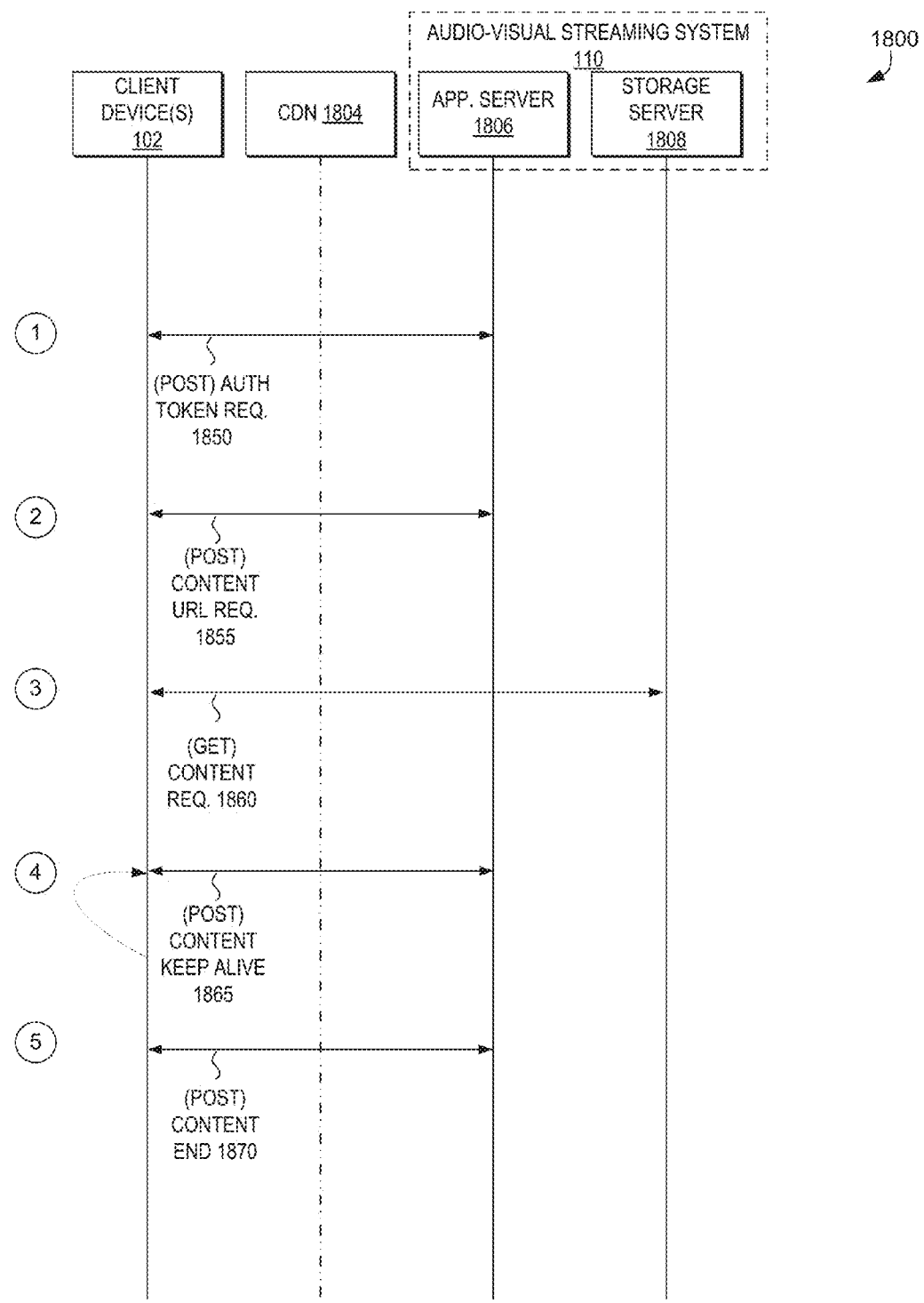
FIG. 18 illustrates a sequence diagram including audio-visual streaming system messaging involved with audio-visual media content distribution according to some embodiments of the present invention.

FIG. 18 illustrates a sequence diagram 1800 including audio-visual streaming system messaging involved with audio-visual media content distribution according to some embodiments of the present invention. The top of diagram 1800 shows client devices 102, CDN 1804, and audio-visual streaming system 100, which includes application server 1806 and storage server 1808 in this embodiment.

A content protection strategy can begin with the communication between clients and servers. In an embodiment, all communication is securely transmitted (over SSL or TLS, for example). This foundation ensures that no information can be intercepted, cached, or modified en route to (or from) the involved client devices.

Embodiments may also be configured to leverage the scale and structure of a CDN 1804 to assist in protecting all backend services from attack by routing all traffic through the secured/monitored CDN infrastructure.

One example of an audio-visual request flow below highlights some steps and security measures enabled, in some embodiments, in every video request made to the audio-visual streaming system 110.

Reference to numbers 1-5 will now refer to the illustrated circles of FIG. 18, which correspond to (1) (POST) Authentication Token Request; (2) (POST) Content URL Request; (3) (GET) Content Request; (4) (POST) Content Keep Alive; and (5) (POST) Content End.

At circle '1', a user accessing the audio-visual streaming system 110 from a client device 102 can be prompted to login to the service, e.g., using a username and password. As part of the login process, client device 102 can submit an authorization token request 1850 and receive an Authentication Token. In some embodiments, the Authentication Token can be used for all future requests (e.g., during a session). In various embodiments, an authorization token can have the following properties: Identifies a single user, may be encrypted (e.g., using AES-GCM 256 bit), Versioned and Expirable, and/or that Uses rotatable keys.

At circle '2,' when a user selects a video, a watch page of the client-side application sends a request 1855 for a URL for the video on the CDN using the Authentication Token. This allows a view service executing at the application server 1806 to confirm that: the provided Authentication Token is valid, the user account status is valid and current, a concurrent view limit has not been hit, and/or that no geographic restrictions have been triggered.

Once the user request has been authorized, the service may return a signed URL (pointing to the video) that exhibits the following properties: (1) Unique URL per Video view request, (2) Signed using HMAC SHA1, (3) Expires after an amount of time, and/or (4) Uses rotatable keys.

At this point, the system 110 may log an entry into a Concurrent Stream Detection service for the particular user and video, to thereby be able to detect any other concurrent streams for the user and/or video.

At circle '3', the client device 102 will then make an HTTPS request 1860 using the signed CDN URL for the video content retrieved in the previous step. The CDN may then confirm that the video URL is: (1) Valid, and/or (2) Has not expired.

Once the signed CDN URL has been validated, the content may be returned either from the edge (e.g., the CDN 1804) or through a secure request back to origin (e.g., storage server 1808).

At circle '4', in some embodiments when a video is loaded, the player may be configured to send a signal back to the Concurrent Stream Detection service (of the application server 1806) on a periodic basis. This signal allows for tracking the existence of inactive streams for particular users.

At circle '5', once the user navigates away from a watch page (e.g., closes or terminates a viewing of the content), the client device player may be configured to send a Content End event message 1870 to the Concurrent Stream Detection service (at app server 1806) to confirm the completion of a stream.

The above description discusses various processing techniques used throughout the system 110 from FIG. 1, including but not limited to techniques performed by the client devices 102, application server 1806, storage server 1808, and/or CDN 1804.

XI. Conclusion

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

In the above description, for the purposes of explanation, specific details are set forth in order to provide a thorough understanding of embodiments of the invention. However, it will be apparent that various embodiments may be practiced without these specific details. The figures and description are not intended to be restrictive.

What is claimed is:

1. A method of using sensors to present content elements on a display of a computing device, the method comprising, by the computing device:
   presenting a first content element on the display;
   identifying a target display time in response to said presenting of the first content element, said target display time comprising a minimum of number of seconds for retaining said presenting of the first content element on the display, wherein said minimum number of seconds is greater than two seconds;
   identifying a gesture count based on the target display time, wherein the gesture count is a number of times a particular gesture is performed to remove the first content element from said display before or by the target display time, and wherein the number of times the particular gesture is performed is at least two;
   receiving data from a sensor, the data comprising a plurality of gestures detected by said sensor;
   retaining the first content element on the display in response to receiving the data from the sensor before said target display time is reached and the data comprising fewer gestures than the gesture count, wherein said retaining comprises incrementing a counter with each gesture of the plurality of gestures during said receiving; and
   replacing the first content element on the display with a second content element on the display in response to the counter equaling or exceeding the gesture count.

2. The method of claim 1, further comprising:
   dynamically determining, during the incrementing of the counter, a fraction of the gesture count that is represented by the counter; and
   displaying a visual indicator on the display, the visual indicator being based on the determined fraction, wherein the visual indicator is changed based on changes to the determined fraction.

3. The method of claim 1, further comprising:
configuring a first distance by which a gesture offsets a position of a content element in said display; and
identifying an increment coefficient for the first content element based on the gesture count, said increment coefficient reducing said first distance to a lesser second distance, wherein said retaining comprises adjusting in response to each gesture of the plurality of gestures, said position of the first content element by the second distance of the increment coefficient.

4. The method of claim 3, further comprising:
changing the increment coefficient from a first value to a second value while incrementing the counter.

5. The method of claim 4, further comprising:
detecting a first amount of force or a greater second amount of force with which a gesture is applied,
wherein changing the increment coefficient from the first value to the second value is based on said detecting.

6. The method of claim 4, further comprising:
detecting velocity based on a start time and an end time of a gesture,
wherein changing the increment coefficient from the first value to the second value is based on said detecting.

7. A device comprising:
a display;
a sensor;
a non-transitory computer-readable medium storing a set of processor-executable instructions; and
one or more processors configured to execute the set of processor-executable instructions, wherein executing the set of processor-executable instructions causes the one or more processors to:
present a first content element on the display;
identify a target display time in response to said presenting of the first content element, said target display time comprising a minimum of number of seconds for retaining said presenting of the first content element on the display, wherein said minimum number of seconds is greater than two seconds;
identify a gesture count based on the target display time, wherein the gesture count is a number of times a particular gesture is performed to remove the first content element from said display before or by the target display time, and wherein the number of times the particular gesture is performed is at least two;
receive data from the sensor, the data comprising a plurality of gestures detected by said sensor;
retain the first content element on the display in response to receiving the data from the sensor before said target display time is reached and the data comprising fewer gestures than the gesture count, wherein said retaining comprises incrementing a counter with each gesture of the plurality of gestures during said receiving; and
replace the first content element on the display with a second content element on the display in response to the counter equaling or exceeding the gesture count.

8. The device of claim 7, wherein the processor-executable instructions further include processor-executable instructions to:
dynamically determine, during the incrementing of the counter, a fraction of the gesture count that is represented by the counter; and
display a visual indicator on the display, the visual indicator being based on the determined fraction, wherein the visual indicator is changed based on changes to the determined fraction.

9. The device of claim 7, wherein the processor-executable instructions further include processor-executable instructions to:
configure a first distance by which a gesture offsets a position of a content element in said display; and
identify an increment coefficient for the first content element based on the gesture count, said increment coefficient reducing said first distance to a lesser second distance, wherein said retaining comprises adjusting in response to each gesture of the plurality of gestures, said position of the first content element by the second distance of the increment coefficient.

10. The device of claim 9, wherein the processor-executable instructions further include processor-executable instructions to:
change the increment coefficient from a first value to a second value while incrementing the counter.

11. The device of claim 10, wherein the processor-executable instructions further include processor-executable instructions to:
detect a first amount of force or a greater second amount of force with which a gesture is applied,
wherein changing the increment coefficient from the first value to the second value is based on said detecting.

12. The device of claim 10, wherein the processor-executable instructions further include processor-executable instructions to:
detect velocity based on a start time and an end time of a gesture,
wherein changing the increment coefficient from the first value to the second value is based on said detecting.

13. A non-transitory computer-readable medium, storing a set of processor-executable instructions, which, when executed by one or more processors of a device, cause the one or more processors to:
present a first content element on a display;
identify a target display time in response to said presenting of the first content element, said target display time comprising a minimum of number of seconds for retaining said presenting of the first content element on the display, wherein said minimum number of seconds is greater than two seconds;
identify a gesture count based on the target display time, wherein the gesture count is a number of times a particular gesture is performed to remove the first content element from said display before or by the target display time, and wherein the number of times the particular gesture is performed is at least two;
receive data from a sensor, the data comprising a plurality of gestures detected by said sensor;
retain the first content element on the display in response to receiving the data from the sensor before said target display time is reached and the data comprising fewer gestures than the gesture count, wherein said retaining comprises incrementing a counter with each gesture of the plurality of gestures during said receiving; and
replace the first content element on the display with a second content element on the display in response to the counter equaling or exceeding the gesture count.

14. The non-transitory computer-readable medium of claim 13, wherein the processor-executable instructions include processor-executable instructions to:
dynamically determine, during the incrementing of the counter, a fraction of the gesture count that is represented by the counter; and display a visual indicator on the display, the visual indicator being based on the determined fraction, wherein the visual indicator is changed based on changes to the determined fraction.

15. The non-transitory computer-readable medium of claim 13, wherein the processor-executable instructions include processor-executable instructions to:
configure a first distance by which a gesture offsets a position of a content element in said display; and
identify an increment coefficient for the first content element based on the gesture count, said increment coefficient reducing said first distance to a lesser second distance, wherein said retaining comprises adjusting in response to each gesture of the plurality of gestures, said position of the first content element by the second distance of the increment coefficient.

16. The non-transitory computer-readable medium of claim 15, wherein the processor-executable instructions include processor-executable instructions to:
change the increment coefficient from a first value to a second value while incrementing the counter.

17. The non-transitory computer-readable medium of claim 16, wherein the processor-executable instructions include processor-executable instructions to:
detect a first amount of force or a greater second amount of force with which a gesture is applied,
wherein changing the increment coefficient from the first value to the second value is based on said detecting.

18. The non-transitory computer-readable medium of claim 16, wherein the processor-executable instructions include processor-executable instructions to:
detect velocity based on a start time and an end time of a gesture,
wherein changing the increment coefficient from the first value to the second value is based on said detecting.

* * * * *